US011924651B2

United States Patent
Xu et al.

(10) Patent No.: US 11,924,651 B2
(45) Date of Patent: Mar. 5, 2024

(54) BASE STATION SUPPORTING SELF-CONFIGURATION AND SELF-OPTIMIZATION AND METHOD THEREOF

(71) Applicant: Samsung Electronics Co., Ltd., Suwon-si (KR)

(72) Inventors: Lixiang Xu, Beijing (CN); Hong Wang, Beijing (CN); Weiwei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 17/451,436

(22) Filed: Oct. 19, 2021

(65) Prior Publication Data

US 2022/0124519 A1     Apr. 21, 2022

(30) Foreign Application Priority Data

Oct. 21, 2020  (CN) ......................... 202011135800.6
Oct. 22, 2020  (CN) ......................... 202011140861.1
Jan. 13, 2021  (CN) ......................... 202110044496.2

(51) Int. Cl.
*H04W 24/02* (2009.01)
*H04W 24/04* (2009.01)
(Continued)

(52) U.S. Cl.
CPC ........... *H04W 24/02* (2013.01); *H04W 24/04* (2013.01); *H04W 36/305* (2018.08); *H04W 76/18* (2018.02); *H04W 76/19* (2018.02)

(58) Field of Classification Search
CPC ..... H04W 24/02; H04W 24/04; H04W 24/08; H04W 36/305; H04W 36/36; H04W 76/18; H04W 76/19

See application file for complete search history.

(56) References Cited

U.S. PATENT DOCUMENTS 9,801,104 B2 * 10/2017 Won ................ H04W 36/00837
2021/0218462 A1 * 7/2021 Shi ........................ H04L 5/0094
(Continued)

FOREIGN PATENT DOCUMENTS

EP      2981121 A1     2/2016
WO   2015167261 A1   11/2015

OTHER PUBLICATIONS

International Search Report and Written Opinion of the International Searching Authority in connection with International Application No. PCT/KR2021/014705 dated Jan. 19, 2022, 8 pages.

(Continued)

*Primary Examiner* — Robert C Scheibel

(57) ABSTRACT

The present disclosure relates to a base station that supports self-configuration and self-optimization and a method thereof. A method performed by a target base station in a mobile communication system includes: receiving a radio link failure (RLF) report of a user equipment (UE) from a source base station or a third base station; detecting a reason for an occurrence of a failure based on the RLF report of the UE; and transmitting a message to the source base station based on the detected reason for the occurrence of the failure.

19 Claims, 15 Drawing Sheets

(51) Int. Cl.
*H04W 36/30* (2009.01)
*H04W 76/18* (2018.01)
*H04W 76/19* (2018.01)

(56) References Cited

U.S. PATENT DOCUMENTS

2022/0141735 A1* 5/2022 Liu .................. H04W 36/0079
                                                        370/331
2022/0330126 A1* 10/2022 Yan ...................... H04W 24/10

OTHER PUBLICATIONS

Ericsson, "Summary of AI 8.13.2-SON, RAN2 scope and requirements", R2-2008288, 3GPP TSG RAN WG2 #111-e, Electronic meeting, Aug. 17-28, 2020, 25 pages.
NTT DOCOMO, Inc., "Discussion on rel-17 Radio Link Failure Report", R2-2006678, 3GPP TSG RAN WG2 #111-e, Electronic meeting, Aug. 17-28, 2020, 5 pages.
Quectel, "Correction to RLF content setting in VarRLF-Report", R2-2007954, 3GPP TSG RAN WG2 #111-e, Electronic meeting, Aug. 17-28, 2020, 9 pages.

* cited by examiner

BASE STATION SUPPORTING SELF-CONFIGURATION AND SELF-OPTIMIZATION AND METHOD THEREOF

CROSS-REFERENCE TO RELATED APPLICATIONS

This application is based on and claims priority under 35 U.S.C. § 119(a) of a Chinese patent application number 202011135800.6, filed on Oct. 21, 2020, in the China National Intellectual Property Administration, a Chinese patent application number 202011140861.1, filed on Oct. 22, 2020 and a Chinese patent application number 202110044496.2, filed on Jan. 13, 2021, in the China National Intellectual Property Administration the disclosure of which is incorporated by reference herein in its entirety.

BACKGROUND

1. Field

The disclosure relates to a wireless communication technology, and particularly, to a base station supporting self-configuration and self-optimization and a method thereof.

2. Description of Related Art

In order to meet an increasing demand for wireless data communication services since a deployment of 4G communication system, efforts have been made to develop an improved 5G or pre-5G communication system. Therefore, the 5G or pre-5G communication system is also called "beyond 4G network" or "post LTE system".

Wireless communication is one of the most successful innovations in modern history. Recently, a number of subscribers of wireless communication services has exceeded 5 billion, and it continues growing rapidly. With the increasing popularity of smart phones and other mobile data devices (such as tablet computers, notebook computers, netbooks, e-book readers and machine-type devices) in consumers and enterprises, a demand for wireless data services is growing rapidly. In order to meet rapid growth of mobile data services and support new applications and deployments, it is very important to improve efficiency and coverage of wireless interfaces.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

An enhanced mobility scheme, how to support mobility robustness in a handover process is currently a problem that needs to be solved.

The present disclosure supports a method for self-configuration and self-optimization, which can support robustness of a handover in an enhanced mobility process, correctly identify a reason for an occurrence of a failure, perform optimization in appropriate way, reduce the occurrence of the failure, ensure service continuity, and reduce operators' labour cost.

According to an aspect of the present disclosure, a method performed by a target base station in a mobile communication system is provided, the method comprising: receiving a radio link failure (RLF) report of a user equipment (UE) from a source base station or a third base station; detecting a reason for an occurrence of a failure based on the UE RLF report; transmitting a message to the source base station based on the detected reason for the occurrence of the failure.

Optionally, the message transmitted to the source base station includes a type of a handover report, wherein the type of the handover report includes at least one of a too early handover, a too late handover, a handover to a wrong cell, a CHO handover, a too late CHO, a too late CHO execution, a too early CHO handover, a too early CHO execution, a CHO to a wrong cell, a CHO execution to a wrong cell, and an inappropriate configuration of a CHO candidate cell.

Optionally, the detecting the reason for the occurrence of the failure based on the UE RLF report at least includes one or more of: if there is a recent CHO execution before the failure occurs, and a first RRC re-establishment attempt cell after the failure or a cell where the UE attempts a RRC connection setup or a cell where the UE successfully establishes the RRC connection is a cell that served the UE at the last handover initialization, then the reason for the occurrence of the failure is the too early CHO execution; if there is a recent CHO execution before the failure occurs, and the first RRC re-establishment attempt cell after the failure or a cell where the CHO is recovered or a cell where a CHO recovery succeeds or a cell where the UE attempts a RRC connection setup or a cell where the UE successfully establishes the RRC connection is neither the cell that served the UE at the last handover initialization, nor a cell that served the UE where the RLF happened or the target cell of the CHO handover execution, then the reason for the occurrence of the failure is the CHO to the wrong cell or the CHO execution to the wrong cell; if there is no recent CHO execution before the failure occurs, according to that the UE RLF report does not include an indication of the CHO execution, or a value of the indication of the CHO execution is no CHO execution, or the UE RLF report does not include a time from the CHO execution to the occurrence of the failure, or the time from the CHO execution to the occurrence of the failure is greater than a configured threshold, then the reason for the occurrence of the failure is the too late CHO or the too late CHO execution; if there is a recent CHO execution before the failure occurs, and the first RRC re-establishment attempt cell after the failure or the cell where the CHO is recovered or the cell where the CHO recovery succeeds or the cell where the UE attempts the RRC connection setup or the cell where the UE successfully establishes the RRC connection is neither the cell that served the UE at the last handover initialization, nor the cell that served the UE where the RLF happened or the target cell of the CHO handover execution, and the first RRC re-establishment attempt cell after the failure or the cell where the CHO is recovered or the cell where the CHO recovery succeeds or the cell where the UE attempts the RRC connection setup or the cell where the UE successfully establishes the RRC connection is not in a CHO candidate cell list, then the reason for the occurrence of the failure is the inappropriate configuration of the CHO candidate.

Optionally, the method further comprises receiving, from the source base station, including a conditional handover (CHO) candidate cell list, a CHO execution condition(s), a CHO configuration information, and/or a time from a CHO configuration to a latest or immediate handover command, wherein the CHO candidate cell list includes all candidate cells for the CHO handover. Optionally, the message transmitted to the source base station further includes the CHO candidate cell list, which includes all candidate cells for the CHO handover.

According to another aspect of the present disclosure, a method performed by a source base station in a mobile communication system is provided, the method comprising: transmitting a radio link failure (RLF) report of a user equipment (UE) to a target base station; receiving a message from the target base station, the message including a reason for an occurrence of a failure detected by the target base station based on the UE RLF report.

Optionally, the message received from the target base station includes a type of a handover report, wherein the type of the handover report includes at least one of a too early handover, a too late handover, a handover to a wrong cell, a CHO handover, a too late CHO, a too late CHO execution, a too early CHO handover, a too early CHO execution, a CHO to a wrong cell, a CHO execution to a wrong cell, and an inappropriate configuration of a CHO candidate cell.

Optionally, the detecting the reason for the occurrence of the failure based on the UE RLF report at least includes one or more of: if there is a recent CHO execution before the failure occurs, and a first RRC re-establishment attempt cell after the failure or a cell where the UE attempts a RRC connection setup or a cell where the UE successfully establishes the RRC connection is a cell that served the UE at the last handover initialization, then the reason for the occurrence of the failure is the too early CHO execution; if there is the recent CHO execution before the failure occurs, and the first RRC re-establishment attempt cell after the failure or a cell where the CHO is recovered or a cell where a CHO recovery succeeds or a cell where the UE attempts the RRC connection setup or a cell where the UE successfully establishes a RRC connection is neither the cell that served the UE at the last handover initialization, nor a cell that served the UE where the RLF happened or the target cell of the CHO handover execution, then the reason for the occurrence of the failure is the CHO to the wrong cell or the CHO execution to the wrong cell; if it is determined that the recent CHO execution does not exist before the failure occurs, according to that the UE RLF report does not include an indication of the CHO execution, or a value of the indication of the CHO execution is no CHO execution, or the UE RLF report does not include a time from the CHO execution to the occurrence of the failure, or the time from the CHO execution to the occurrence of the failure is greater than a configured threshold, then the reason for the occurrence of the failure is the too late CHO or the too late CHO execution; if there is the recent CHO execution before the failure occurs, and the first RRC re-establishment attempt cell after the failure or the cell where the CHO is recovered or the cell where the CHO recovery succeeds or the cell where the UE attempts the RRC connection setup or the cell where the UE successfully establishes the RRC connection is neither the cell that served the UE at the last handover initialization, nor the cell that served the UE where the RLF happened or the target cell of the CHO handover execution, and the first RRC re-establishment attempt cell after the failure or the cell where the CHO is recovered or the cell where the CHO recovery succeeds or the cell where the UE attempts the RRC connection setup or the cell where the UE successfully establishes the RRC connection is not in a CHO candidate cell list, then the reason for the occurrence of the failure is the inappropriate configuration of the CHO candidate.

Optionally, the method further comprises transmitting, to the target base station, a conditional handover (CHO) candidate cell list and/or a CHO execution condition(s), wherein, the CHO candidate cell list includes all candidate cells for the CHO handover.

Optionally, the message received from the target base station further includes the CHO candidate cell list, which includes all candidate cells for the CHO handover.

According to still another aspect of the present disclosure, a method performed by a source base station in a mobile communication system is provided, the method comprising: receiving a radio link failure (RLF) report of a user equipment (UE); confirming a reason for an occurrence of a failure based on the UE RLF report.

Optionally, the RLF report of the UE is received by the source base station through a third base station, through a target base station, or directly from the UE.

Optionally, the confirming the reason for the occurrence of the failure based on the UE RLF report at least includes one or more of: if there is a recent CHO execution before the failure occurs, and the first RRC re-establishment attempt cell after the failure or a cell where the UE attempts a RRC connection setup or a cell where the UE successfully establishes the RRC connection is a cell that served the UE at the last handover initialization, then the reason for the occurrence of the failure is a too early CHO execution; if there is the recent CHO execution before the failure occurs, and the first RRC re-establishment attempt cell after the failure or a cell where the CHO is recovered or a cell where a CHO recovery succeeds or a cell where the UE attempts the RRC connection setup or a cell where the UE successfully establishes a RRC connection is neither the cell that served the UE at the last handover initialization, nor a cell that served the UE where the RLF happened or the target cell of the CHO handover execution, then the reason for the occurrence of the failure is a CHO to a wrong cell or a CHO execution to a wrong cell; if it is determined that the recent CHO execution does not exist before the failure occurs, according to that the UE RLF report does not include an indication of the CHO execution, or a value of the indication of the CHO execution is no CHO execution, or the UE RLF report does not include a time from the CHO execution to the occurrence of the failure, or the time from the CHO execution to the occurrence of the failure is greater than a configured threshold, then the reason for the occurrence of the failure is a too late CHO or a too late CHO execution; if there is the recent CHO execution before the failure occurs, and the first RRC re-establishment attempt cell after the failure or the cell where the CHO is recovered or the cell where the CHO recovery succeeds or the cell where the UE attempts the RRC connection setup or the cell where the UE successfully establishes the RRC connection is neither the cell that served the UE at the last handover initialization, nor the cell that served the UE where the RLF happened or the target cell of the CHO handover execution, and the first RRC re-establishment attempt cell after the failure or the cell where the CHO is recovered or the cell where the CHO recovery succeeds or the cell where the UE attempts the RRC connection setup or the cell where the UE successfully establishes the RRC connection is not in a CHO candidate cell list, then the reason for the occurrence of the failure is an inappropriate configuration of a CHO candidate.

Optionally, the method further comprises transmitting, to the target base station, including a conditional handover (CHO) candidate cell list, a CHO execution condition(s), a CHO configuration information, and/or a time from a CHO configuration to a latest or immediate handover command, wherein the CHO candidate cell list includes all candidate cells for the CHO handover.

Optionally, the message received from the target base station further includes the CHO candidate cell list, which includes all candidate cells for the CHO handover.

Optionally, the method further comprises transmitting a handover required message to the target base station.

Optionally, the method further comprises transmitting a RRC re-configuration message including the CHO configuration information to the UE and receiving the UE RLF report from the UE.

According to yet another aspect of the present disclosure, a method performed by a target base station in a mobile communication system is provided, the method comprising: receiving a message from a source base station; receiving a successful handover report from a UE; and transmitting an access and move indication message to the source base station.

Optionally, the message received from the source base station includes information about the CHO candidate cell list and/or the CHO execution condition(s). The message further includes the CHO configuration information and/or the time from the CHO configuration to the latest or immediate handover command. The CHO configuration is the CHO configuration transmitted by the source base station to the UE. The handover command is a handover command message latest to/following the CHO configuration, and is used to trigger a normal handover.

Optionally, the successful handover report at least includes one or more of: an identifier of the source cell, a cell global identifier of a cell to which a last the RRC re-configuration message is transmitted, which further includes a tracking area code (TAC) of the cell; a primary cell identifier of the target cell, which may further include the TAC or a TAI of the cell; a cell radio network temporary identifier (C-RNTI); a type of the failure; a measurement result of the UE.

Optionally, the access and move indication message transmitted by the target base station to the source base station includes the successful handover report. The message may further include the type of the handover, the CHO candidate cell list, the CHO execution condition(s), the CHO configuration information, and/or the time from the CHO configuration to the latest or immediate handover command.

According to yet another aspect of the present disclosure, a target base station in a mobile communication system is provided, comprising: a transceiver, configured to transmit/receive a signal to/from another network entity; and a controller, configured to control an overall operation of the target base station, wherein, the target base station is configured to perform the method performed by the target base station as described above.

According to yet another aspect of the present disclosure, a source base station in a mobile communication system is provided, comprising: a transceiver, configured to transmit/receive a signal to/from another network entity; and a controller, configured to control an overall operation of the source base station, wherein, the source base station is configured to perform the method performed by the source base station as described above.

Though the methods and base stations supporting self-configuration and self-optimization as described above, it is possible to support robustness of a handover in an enhanced mobility process, correctly identify a reason for an occurrence of a failure, to perform optimization in appropriate way, reduce the occurrence of the failure, ensure service continuity, and reduce operators' labour cost.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

Through the following description in conjunction with the accompanying drawings, the above and additional aspects and advantages of the present disclosure will become more apparent and easier to understand, in which.

DETAILED DESCRIPTION

FIGS. 1 to 15 discussed below and various embodiments for describing the principles of the present disclosure in this patent document are only for illustration and should not be interpreted as limiting the scope of the disclosure in any way. Those skilled in the art will understand that the principles of the present disclosure can be implemented in any suitably arranged system or device.

Figure 1:
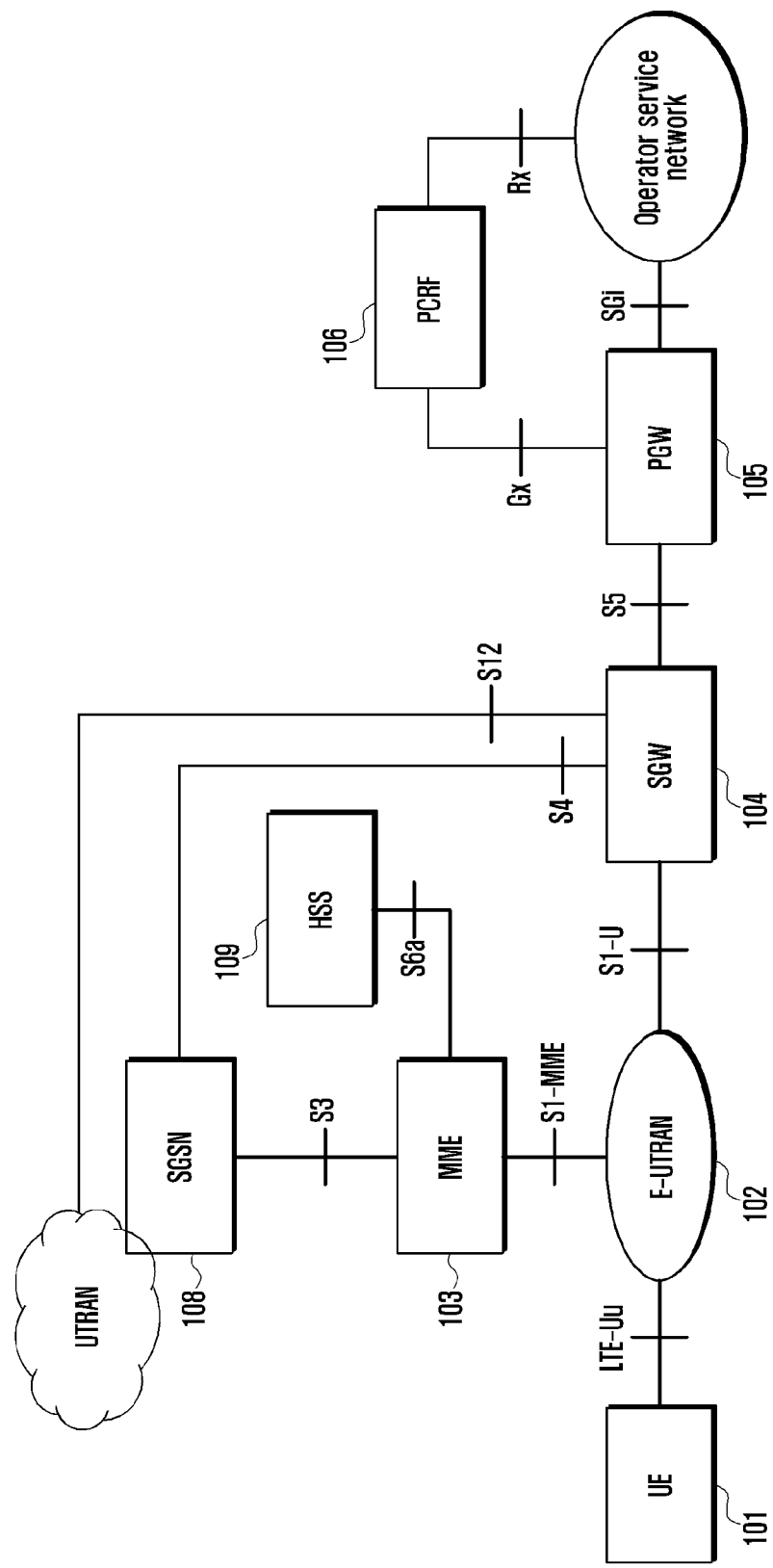
FIG. 1 illustrates an exemplary system architecture of system architecture evolution (SAE)

FIG. 1 illustrates an exemplary system architecture 100 of system architecture evolution (SAE). User equipment (UE) 101 is a terminal device for receiving data. An evolved universal terrestrial radio access network (E-UTRAN) 102 is a radio access network, which includes a macro base station (eNodeB/NodeB) that provides UE with interfaces to access the radio network. A mobility management entity (MME) 103 is responsible for managing mobility context, session context and security information of the UE. A serving gateway (SGW) 104 mainly provides functions of user plane, and the MME 103 and the SGW 104 may be in the same physical entity. A packet data network gateway (PGW) 105 is responsible for functions of charging, lawful interception, etc., and may be in the same physical entity as the SGW 104. A policy and charging rules function entity (PCRF) 106 provides quality of service (QoS) policies and charging criteria. A general packet radio service support node (SGSN) 108 is a network node device that provides routing for data transmission in a universal mobile telecommunications system (UMTS). A home subscriber server (HSS)109 is a home subsystem of the UE, and is responsible for protecting user information including a current location of the user equipment, an address of a serving node, user security information, and packet data context of the user equipment, etc.

Figure 2:
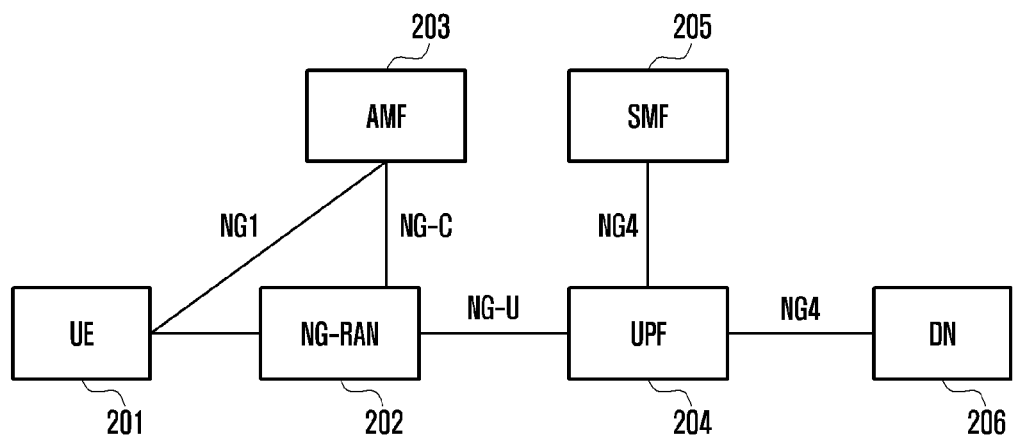
FIG. 2 illustrates an exemplary system architecture according to various embodiments of the present disclosure.

FIG. 2 illustrates an exemplary system architecture 200 according to various embodiments of the present disclosure. Other embodiments of the system architecture 200 can be used without departing from the scope of the present disclosure.

User equipment (UE) 201 is a terminal device for receiving data. A next generation radio access network (NG-RAN)

202 is a radio access network, which includes a base station (a gNB or an eNB connected to 5G core network 5GC, and an eNB connected to the 5GC is also called ng-gNB) that provides UE with interfaces to access the radio network. An access control and mobility management function entity (AMF) 203 is responsible for managing mobility context and security information of the UE. A user plane function entity (UPF) 204 mainly provides functions of user plane. A session management function entity SMF 205 is responsible for session management. A data network (DN) 206 includes, for example, services of operators, access of Internet and service of third parties.

When a UE moves between two base stations, in order to improve reliability of a handover, a conditional handover (CHO) is defined in Release 16 of 3GPP. In appropriate setting or triggering of the CHO process may also result in a radio link failure (RLF) or a handover failure (HOF). How to identify a type of the failure to perform optimization in appropriate way is a problem that needs to be solved at present.

Exemplary embodiments of the present disclosure are further described below with reference to the accompanying drawings.

The text and drawings are provided as examples only to help understand the present disclosure. They should not be interpreted as limiting the scope of the present disclosure in any way. Although certain embodiments and examples have been provided, based on the disclosure herein, it will be apparent to those skilled in the art that changes may be made to the illustrated embodiments and examples without departing from the scope of the present disclosure.

Figure 3:
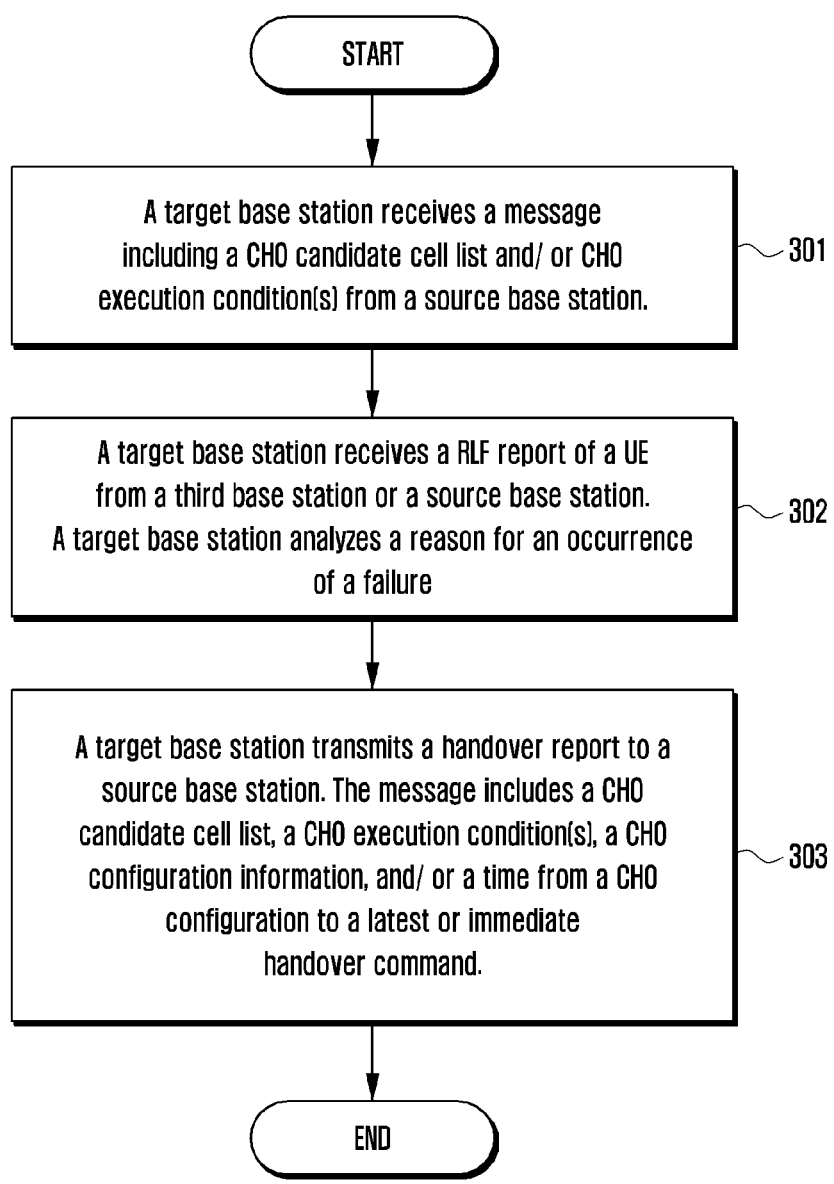
FIG. 3 illustrates a flowchart of a method one supporting self-configuration and self-optimization according to an exemplary embodiment of the present disclosure.

FIG. 3 illustrates a flowchart of a method supporting self-configuration and self-optimization according to an exemplary embodiment of the present disclosure method (hereinafter referred to as method one). This embodiment is particularly applicable to a scenario where a radio link failure occurs soon after a CHO handover succeeds.

At step 301, in response to a source base station determining to initiate a CHO handover, a target base station receives a message including a CHO candidate cell list and/or a CHO execution condition(s) from the source base station. The message further includes a CHO configuration information and/or a time from the CHO configuration to a latest or immediate handover command. The CHO configuration is a CHO configuration transmitted by the source base station to the UE. The handover command is a handover command message latest to/following the CHO configuration and is used to trigger a normal handover.

The message may be a handover request message, an early status transfer message, a serial number (SN) status transfer message, a newly defined message, or another existing message. The message may be transmitted by the source base station to the target base station in a handover preparation phase or transmitted to the target base station after the source base station receives a handover success message or transmitted to the target base station at other times, which is not limited by the present disclosure. The target base station may receive the above information from the source base station through a same message(s) or different messages. The target base station saves the received information. The CHO candidate cell list includes all candidate cells for this CHO handover determined by the source base station, including all candidate cells on the target base station that receives the message and the candidate cells on other potential target base station(s).

Information on each candidate cell includes a Cell Global Identifier. There may be one or more CHO execution conditions, which is the same as a CHO execution condition(s) transmitted by the source base station to the UE through a RRC re-configuration message. The source base station transmits a CHO candidate cell list, a CHO execution condition(s), a CHO configuration information, and/or a time from a CHO configuration to a latest or immediate handover command to the target base station via an inter-base station interface message, or the source base station transmits the CHO candidate cell list, the CHO execution condition(s), the CHO configuration information, and/or the time from the CHO configuration to the latest or immediate handover command to the target base station via a source base station-to-core network interface message and a core network-to-target base station interface message. It may be a source-to-target transparent container in handover required message from the source base station to the core network and in a handover request message from the core network to the target base station that transmits the CHO candidate cell list, the CHO execution condition(s), the CHO configuration information, and/or the time from the CHO configuration to the latest or immediate handover command to the target base station.

At step 302, the target base station receives a radio link failure (RLF) report of the UE from a third base station or the source base station. The radio link failure report at least includes one or more of the followings:

An identifier of a previous primary cell, a cell global identifier of a cell in which a last RRC re-configuration message is transmitted, further including a tracking area code (TAC) of the cell;

An identifier of a failed primary cell, a cell global identifier of a cell where a RLF failure occurs or a target cell when a handover fails, further including a TAC of the cell;

A cell identifier of a target cell to which a CHO executes failure, further including a TAC of the cell. The above identifier of the failed primary cell may also be used to indicate the cell identifier of the target cell for the CHO execution failure;

A cell radio network temporary identifier (C-RNTI), a C-RNTI used in a cell where a RLF failure occurs or a C-RNTI of a source cell when a handover fails;

A reconnected cell identifier, a cell global identifier of a cell that the UE successfully accesses after a failure, further including a TAC of the cell;

A time from a failure to a successful access to a network;

A cell identifier of a reestablishment cell, a cell identifier of a cell where a UE initiates a RRC re-establishment;

A time from receiving a RRC re-configuration message including a handover command to an occurrence of a failure; for a CHO, the time represents a time from receiving the RRC re-configuration message including the CHO configuration to the occurrence of the failure or represents a time from the CHO execution to the occurrence of the failure. For the case where the UE receives a legacy handover command immediately after receiving the CHO configuration, the time may be two times, namely, a time from the CHO configuration to the failure and a time from the legacy handover command to the occurrence of the failure;

A time from receiving a RRC re-configuration message including a CHO configuration to an occurrence of a failure, this information may indicate a time from receiving the RRC re-configuration message including the CHO configuration to the occurrence of the failure during the CHO, by defining a new information element or by the above-mentioned information element of the time from receiving the RRC re-configuration message including the handover command to the occurrence of the failure;

A time from receiving a RRC re-configuration message including a CHO configuration to receiving a legacy handover command;

A time from an occurrence of a failure to a sending of a UE RLF report;

A Type of a connection failure, including a radio link failure and a handover failure. A CHO handover failure may be further included;

A cell identifier of a cell where a CHO is recovered, a Cell Global Identifier of the cell where the CHO is recovered, and a TAC of the cell may be further included;

A cell identifier of a cell where a CHO recovery succeeds, a Cell Global Identifier of the cell where the CHO recovery succeeds, and a TAC of the cell may be further included;

A cell identifier of a cell where a CHO recovery fails, a Cell Global Identifier of the cell where the CHO recovery fails, and a TAC of the cell may be further included;

An indication of a CHO recovery, the indication information may be used to indicate that the CHO recovery is successful or the CHO recovery is unsuccessful;

Indication information on whether a CHO condition is met or not met. It may further include information about which CHO execution condition is met or not met.

A time from a CHO execution to an occurrence of a failure. If a time from receiving a RRC re-configuration message including a handover command to the occurrence of the failure refers to a time from receiving a RRC re-configuration message including a CHO configuration to the occurrence of the failure for the CHO, then it is needed to include a time from the CHO execution to the occurrence of the failure;

A time from receiving a RRC re-configuration message including a CHO configuration to a CHO execution; this information element may not be included separately, and the base station calculates the time from receiving the RRC re-configuration message including the CHO configuration to the CHO execution according to a time difference between a time from receiving the RRC re-configuration message including the CHO configuration to the occurrence of the failure and a time from the CHO execution to the occurrence of the failure;

An indication of a CHO configuration;

An indication of a CHO execution, the indication information may be used to indicate whether the CHO execution is performed or not;

A time from receiving a CHO configuration to an immediately following RRC re-configuration message including a handover command;

An event or condition for a CHO execution;

A time from a CHO handover failure to a next CHO recovery failure;

A time from a CHO configuration to an immediately following reception of a RRC re-configuration message including a handover command;

Indication of A CHO failure and a CHO recovery failure or an indication of a second failure; and A measurement result of a UE. The measurement result includes the measurement result for a serving cell, a CHO candidate cell(s), and/or a neighbouring cell. For a cell that satisfies the CHO execution condition(s), the information further includes an indication information that satisfies the execution condition(s). The measurement result includes a measurement result when a handover is triggered, a measurement result when a CHO configuration is received, a measurement result at a CHO execution, a measurement result when a handover is performed, a measurement result when a failure occurs, a measurement result after a handover is performed, and/or a measurement result when a handover is successful.

For two consecutive failures, such as a CHO handover failure and an immediately following CHO recovery failure or a CHO handover failure and an immediately following HOF, the UE may also save two RLF reports. A failed primary cell identifier is a cell identifier of a cell in which a first failure and a second failure occurred respectively, or a cell identifier of a handover target cell for a handover failure. For example, if a CHO execution to a cell A fails, and the UE fails to perform CHO recovery in a cell B, then the failed primary cell identifier included in a first RLF report is an identifier of the cell A, and the failed primary cell identifier included in the second RLF report is the identifier of the cell B. The above-mentioned failure-related timer is also calculated according to the times when two failures occurred separately.

A time from receiving a RRC re-configuration message including a handover command to an occurrence of a failure included in the first RLF report is a time from receiving the RRC re-configuration message including the handover command to a CHO execution failure. A time from receiving the RRC re-configuration message including the handover command to the time when the failure occurs included in the second the RLF report is a time from receiving the RRC re-configuration message including the handover command to a CHO recovery failure. For a time from the CHO execution to failure, the first RLF report includes the time from the CHO execution to the performing failure, and the second the RLF report includes the time from the CHO execution to the CHO recovery failure. The RLF report may be one but includes information about two failures, such as including the cell identifiers of the two failed cells, the two times from receiving the RRC re-configuration message including the handover command to the occurrence of the failures as above, and the two times from the CHO execution to the failures as above.

According to an implementation, the above-mentioned UE RLF report is received by the source base station or the third base station from the UE.

According to one implementation, the target base station may be used in the method of the present disclosure to detect the reason for the occurrence of the failure, for example, based on one or more of the CHO candidate cell list, the CHO execution condition(s), and/or the RLF report; according to another implementation, the source base station may be used in the method of the present disclosure to detect the reason for the occurrence of the failure, for example, based on one or more of the CHO candidate cell list, the CHO execution condition(s), and/or the RLF report. According to another implementation, the target base station may be used in the method of the present disclosure to detect the reason for the occurrence of the failure, for example, based on one or more of the CHO candidate cell list, the CHO execution condition(s), and/or the RLF report, and then the source base station may be used in the method of the present disclosure to determine the reason for the occurrence of the failure, for example, based on one or more of the CHO candidate cell list, the CHO execution condition(s), and/or the RLF report.

The target base station and the source base station may also consider other factors without affecting the main content of the present disclosure.

The reason for the occurrence of the failure may be one or more of a too early CHO execution, a CHO to a wrong cell or a CHO execution to a wrong cell, a too late CHO or a too late CHO execution, inappropriate configuration of a CHO candidate cell.

A too early CHO execution: if there is a recent CHO execution before the failure occurs, for example, there is a recent CHO execution before the occurrence of the failure is determined according to an indication of the CHO execution or a time from the CHO execution to the occurrence of the failure is smaller than a configured threshold, and the first RRC re-establishment attempt cell after the failure or a cell where the UE attempts RRC connection setup or a cell where the UE successfully establishes the RRC connection is a cell that served the UE at the last handover initialization, then the reason for the occurrence of the failure is a too early CHO execution. It should be noted that the cell that served the UE at the last handover initialization is also the source cell when the last handover occurs.

A CHO to a wrong cell or a CHO execution to a wrong cell: if there is a recent CHO execution before the failure occurs, for example, there is a recent CHO execution before the occurrence of the failure is determined according to the indication of the CHO execution or according to the time from the CHO execution to the occurrence of the failure is smaller than a configured threshold, and the first RRC re-establishment attempt cell after the failure or the cell where the CHO is recovered or the cell where the CHO recovery succeeds or the cell where the UE attempts RRC connection setup or the cell where the UE successfully establishes the RRC connection is not the cell that served the UE at the last handover initialization, nor the cell that served the UE where the RLF happened or the target cell of the CHO handover execution, then the reason for the occurrence of the failure is a CHO to a wrong cell or a CHO execution to a wrong cell. It should be noted that the cell that served the UE at last handover initialization is also the source cell at last handover initialization.

A too late CHO or a too late CHO execution: If there is no recent CHO execution before the failure occurs, for example, there is no recent CHO execution before the failure is determined according to that the UE RLF report does not include the indication of the CHO execution or the value of the indication of the CHO execution is no CHO execution or the UE RLF report does not include a time from the CHO execution to the occurrence of the failure or the time from the CHO execution to the occurrence of the failure is greater than a configured threshold, then the reason for the occurrence of the failure is a too late CHO or a too late CHO execution.

An inappropriate configuration of a CHO candidate cell: if there is a recent CHO execution before the failure, for example, there is a recent CHO execution before the occurrence of the failure is determined according to the indication of the CHO execution or the time from the CHO execution to the occurrence of the failure is smaller than a configured threshold, and the first RRC re-establishment attempt cell after the failure or the cell where the CHO is recovered or the cell where the CHO recovery succeeds or the cell where the UE attempts RRC connection setup or the cell where the UE successfully establishes the RRC connection is not the cell serving the UE at the last handover initialization, nor the cell that served the UE where the RLF happened or the target cell of the CHO handover execution, and the first RRC re-establishment attempt cell after the failure occurs or the cell where the CHO is recovered or the cell where the CHO recovery succeeds or the cell where the UE attempts the RRC connection setup or the cell where the UE successfully establishes the RRC connection is not in the CHO candidate cell list, then the reason for the occurrence of the failure is an inappropriate configuration of the CHO candidate cell.

The inappropriate configuration of the CHO candidate cell can be used alone as the reason for the failure or the type of the handover report, or it may be further determined whether it is the inappropriate configuration of the CHO candidate cell when the reason for the failure or the type of the handover report is a CHO to a wrong cell or a CHO execution to a wrong cell. After the target base station detects a CHO to a wrong cell or a CHO execution to a wrong cell, the inappropriate configuration of a CHO candidate cell is determined according to that the cell where the first RRC re-establishment attempt cell after the failure occurs or the cell where the CHO is recovered or the cell where the CHO recovery succeeds or the cell where the UE attempts RRC connection setup or the cell where the UE successfully establishes the RRC connection is not in the CHO candidate cell list.

For consecutive failures, the base station may check the reason for the occurrence of the failure according to the information of the first failure and/or the information of the second failure. The base station may check the reason for the occurrence of the failure according to the above method. The base station that causes the problem uses the information of two failures for optimization to avoid further problems.

At step 303, the target base station transmits a message to the source base station. The message may include the CHO candidate cell list, the CHO execution condition(s), the CHO configuration information, and/or the time from the CHO configuration to the latest or immediate handover command. The information is received from the source base station in the step 301. The CHO candidate cell list includes all candidate cells for this CHO handover. The message may further include the UE RLF report. The message may further include the type of the handover report, which indicates the reason for the occurrence of the failure. The type of the handover report includes at least one of a too early handover, a too late handover, a handover to a wrong cell, a CHO handover, a too late CHO, a too late CHO execution, a too early CHO, a too early CHO execution, a CHO to a wrong cell, a CHO execution to a wrong cell, or an inappropriate configuration of a CHO candidate cell.

The message may further include the cell identifier of the source cell, the cell identifier of the target cell, and/or the cell identifier of the RRC connection is reestablishment cell or the successful re-connect cell after the occurrence of the failure or the cell where the CHO recovery succeeds. The message may further include an indication of the handover type. The handover type includes a normal handover, a CHO handover, a Dual Active Protocol Stack (DAPS) handover, etc. The message may further include the cell identifier of the cell where the CHO recovery fails. The message may further include the indication information of the second failure. The message may further include the CHO configuration indication.

The message may further include the inappropriate configuration of the CHO candidate cell. When the type of the handover report is a CHO to a wrong cell or a CHO execution to a wrong cell, an inappropriate configuration of a CHO candidate cell is included. The inappropriate configuration of the CHO candidate cell includes a cell(s) satisfying the CHO execution condition(s) but not in the CHO candidate cell list, a cell(s) may be in CHO candidate cell list but not in the CHO candidate cell list, and/or a cell(s) in the CHO candidate cell list but not appropriate for being in the CHO candidate cell list. The target base station determines the inappropriate configuration of the CHO candidate cell according to the measurement report of the UE, the cell identifier included in the RLF report and/or CHO execution condition(s). The cell identifier included in the RLF report may be one or more of the cell identifiers described in the step 302. For example, according to the measurement result in the UE measurement report, for a cell with good quality but not in the candidate cell list, the cell needs to be included in the candidate cell list. Or for a cell with poor quality in the UE measurement report but in the candidate cell list, the cell is not appropriate to be included in the candidate cell list.

Among them, the advantage that the CHO candidate cell list, the CHO execution condition(s), the CHO configuration information, and/or the time from the CHO configuration to the latest or immediate handover command are transmitted from the source base station to the target base station, and transmitted from the target base station back to the source base station is: for a case where the radio link failure occurs shortly after the CHO handover success, the source base station has released a UE context, so the source base station does not know the candidate cell list, the CHO execution condition(s), the CHO configuration information and/or the time from the CHO configuration to the latest or immediate handover command of a previous CHO handover. The source base station needs to further determine whether the failure is caused by an inappropriate configuration of the candidate cell or an inappropriate configuration of the CHO execution condition(s) according to the CHO candidate cell list.

For example, when the UE successfully completes the CHO handover from the source base station to the target base station, the UE encounters the RLF failure at the target base station, and the UE succeeds in the RRC re-establishment or succeeds in the RRC connection setup in the third base station, if the successful RRC reestablishment cell or the successful RRC setup cell in the third base station is not in the candidate cell list, the reason for the occurrence of the failure includes an inappropriate configuration of the candidate cell, may also include an inappropriate configuration of the CHO execution condition(s) at the same time; if successful RRC reestablishment cell or the successful RRC setup cell in the third base station is in the candidate cell list, the reason for the occurrence of the failure is an inappropriate configuration of the CHO execution condition(s). After determining the reason of the failure, the source base station may also use the CHO execution condition(s) and/or the candidate cell list to optimize the CHO handover to avoid future any CHO handover failure.

According to an implementation, the target base station detects the reason for the occurrence of the failure, in this case, the message may include the reason for the occurrence of the failure detected by the target base station. According to an implementation, the source base station confirms the reason for the occurrence of the failure. In this case, the source base station confirms the reason for the occurrence of the failure and optimizes according to the type of the received handover report, the UE RLF report, the CHO candidate cell list, the CHO execution condition(s), the CHO configuration information, and/or the time from the CHO configuration to the latest or immediate handover command.

The method for the source base station to determine the reason for the occurrence of the failure is the same as the method described in the step 302. In addition, the source base station may also consider other information to determine the reason for the occurrence of the failure and optimize the failure. According to an implementation, the target base station detects that the reason for the occurrence of the failure is one or more of a too late CHO, a too late CHO execution, a too early CHO, a too early CHO execution, a CHO to a wrong cell, a CHO execution to a wrong cell, in this case, the message may include the reason for the occurrence of the failure detected by the target base station, such as but not limited to, that the source base station determines the occurrence of the failure to be an inappropriate configuration of the CHO candidate cell and/or an inappropriate configuration of the CHO execution condition(s), and the source base station determines whether the occurrence of the failure is one or more of the inappropriate configuration of the CHO candidate cell and/or the inappropriate configuration of the CHO execution condition(s) according to the type of the received handover report, the UE RLF report, the CHO candidate cell list, the CHO execution condition(s), the CHO configuration information, and/or the time from the CHO configuration to the latest or immediate handover command, and optimizes the configuration. The method for the source base station to determine the inappropriate configuration of the CHO candidate cell is the same as that described in the step 302 and will not be repeated here.

According to one embodiment, if the source base station receives two UE RLF reports or receives an indication for a second failure or receives information on the two failures, the source base station may determine that a handover to the RRC reestablishment cell or a handover to the successful RRC reconnect cell after the occurrence of the failure instead of a handover to the target cell or the cell where the CHO recovery fails may be performed, according to a received cell identifier of the source cell, a cell identifier of the target cell, a cell identifier of the RRC reestablishment cell, or a cell identifier of the successful RRC reconnect cell after the occurrence of the failure, and/or a cell identifier of the cell where the CHO recovery fails, so as to optimize the corresponding the CHO handover condition.

According to one embodiment, if the source base station receives a too early handover, a too late handover, a handover to a wrong cell and receives an indication of the CHO configuration, the source base station may determine to optimize CHO in appropriate way.

The method one for supporting self-configuration and self-optimization of the present disclosure is shown in an exemplary way above. Although the method one is described from the perspective of the target base station, those skilled in the art may understand that the source base station may perform corresponding operations. In order to avoid redundancy, the present disclosure will not repeat the description. Through the above method one, it is possible to support robustness of a handover in an enhanced mobility process, correctly identify a reason for an occurrence of a failure, to perform optimization in appropriate way, reduce the occurrence of the failure, ensure service continuity, and reduce operators' labour cost.

Figure 4:
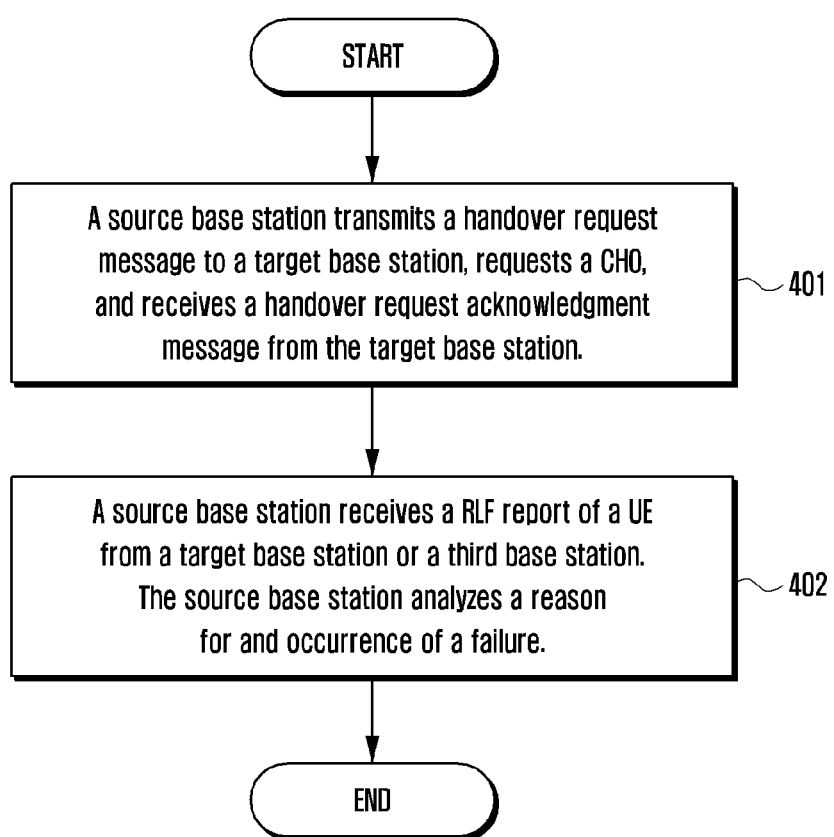
FIG. 4 illustrates a flowchart of a method two supporting self-configuration and self-optimization according to an exemplary embodiment of the present disclosure.

FIG. 4 illustrates a flowchart of a method of supporting self-configuration and self-optimization according to an exemplary embodiment of the present disclosure (hereinafter referred to as method two). This embodiment is particularly applicable to a scenario of the CHO execution failure, the CHO execution failure being immediately followed by the CHO recovery failure, UE receiving the CHO configuration being followed by the handover failure, and/or UE successfully accessing the target base station or other base stations after the source base station encounters the RLF failure.

At step 401, the source base station transmits a handover request message to the target base station, requesting the CHO. The source base station receives a handover request acknowledgment message of the target base station. The handover request message may include the CHO candidate cell list, the CHO execution condition(s), the CHO configuration information, and/or the time from the CHO configuration to the latest or immediate handover command. Optionally, the source base station transmits the RRC re-configuration message including the CHO to the UE. This method may be used for a failure occurred at the UE when the source base station has not transmitted the RRC re-configuration message to the UE or a failure occurred after the source base station transmits the RRC re-configuration message to UE. Therefore, it is an optional step for the source base station to transmit the RRC re-configuration message including the CHO to the UE.

The source base station receives the UE's the RLF report from the target base station, the third base station or directly receives the RLF report from the UE. According to an embodiment, the RLF report of the UE is received by the target base station or the third base station from the UE. According to another embodiment, the RLF report of the UE is directly received from the UE by the source base station. The content of the UE RLF report is the same as that described in the step 302 and will not be repeated here.

The source base station detects the reason for the occurrence of the failure. The method of the source base station's detection is the same as that described in the step 302 and will not be repeated here.

So far, the method two of supporting self-configuration and self-optimization of the present disclosure is completed, which may support robustness of a handover in an enhanced mobility process, correctly identify a reason for an occurrence of a failure, to perform optimization in appropriate way, reduce the occurrence of the failure, ensure service continuity, and reduce operators' labour cost.

Figure 5:
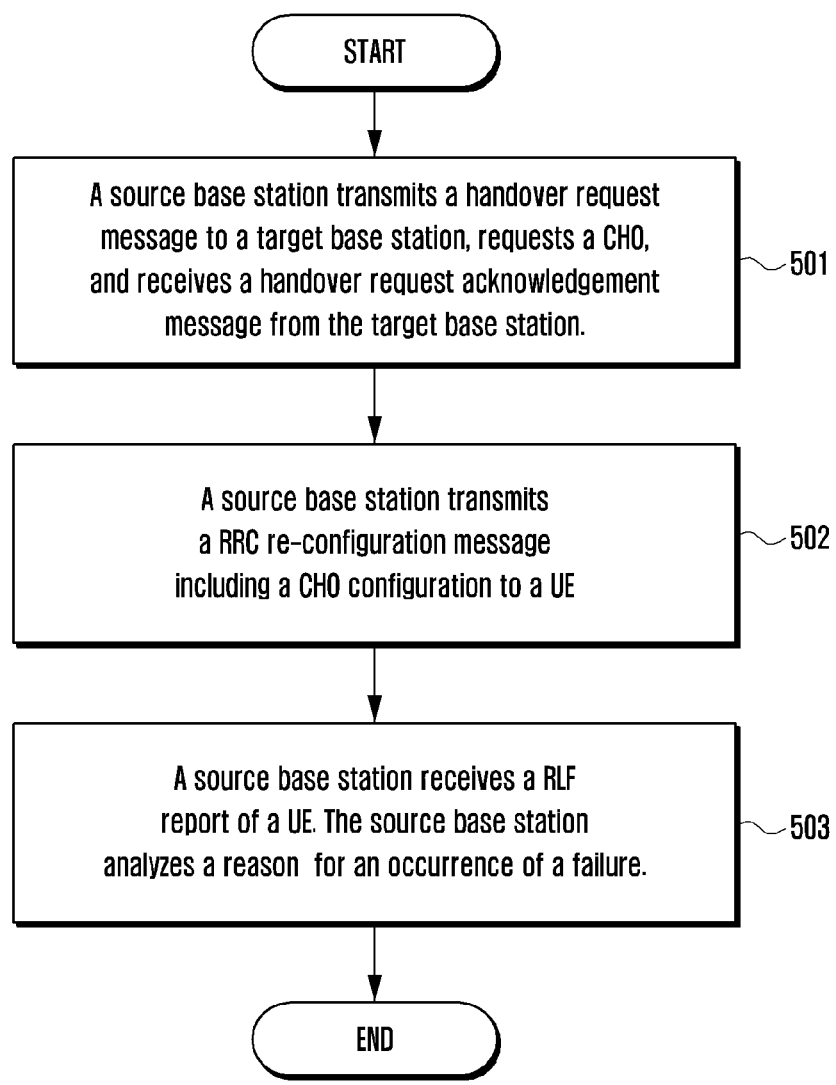
FIG. 5 illustrates a flowchart of a method three supporting self-configuration and self-optimization according to an exemplary embodiment of the present disclosure.

FIG. 5 illustrates a flowchart of a method supporting self-configuration and self-optimization according to an exemplary embodiment of the present disclosure (hereinafter referred to as method three). This embodiment is particularly applicable to a scenario of the CHO execution failure, the CHO execution failure being immediately followed by the CHO recovery failure, and/or UE receiving the CHO configuration being followed by the handover failure and the UE successfully accessing the source base station.

At step 501, the source base station transmits the handover request message to the target base station, requesting the CHO. The handover request message may include the CHO candidate cell list, the CHO execution condition(s), the CHO configuration information, and/or the time from the CHO configuration to the latest or immediate handover command. The source base station receives the handover request acknowledgment message of the target base station.

At step 502, the source base station transmits the RRC re-configuration message including the CHO configuration information to the UE.

At step 503, the source base station receives the UE's the RLF report from the UE. After the UE succeeds in the RRC re-establishment or RRC re-connection at the source base station, the source base station requests the UE to report the RLF report, and the UE transmits the RLF report to the source base station.

The content of the UE RLF report is the same as that described in the step 302 and will not be repeated here.

The source base station detects the reason for the occurrence of the failure. The method of the source base station's detection is the same as that described in the step 302 and will not be repeated here.

So far, the method three of supporting self-configuration and self-optimization of the present disclosure is completed, which may support robustness of a handover in an enhanced mobility process, correctly identify a reason for an occurrence of a failure, to perform optimization in appropriate way, reduce the occurrence of the failure, ensure service continuity, and reduce operators' labour cost.

So far, the method for supporting self-configuration and self-optimization of the present disclosure is completed. This method may support robustness of a handover in an enhanced mobility process, correctly identify a reason for an occurrence of a failure, to perform optimization in appropriate way, reduce the occurrence of the failure, ensure service continuity, and reduce operators' labour cost.

Figure 6:
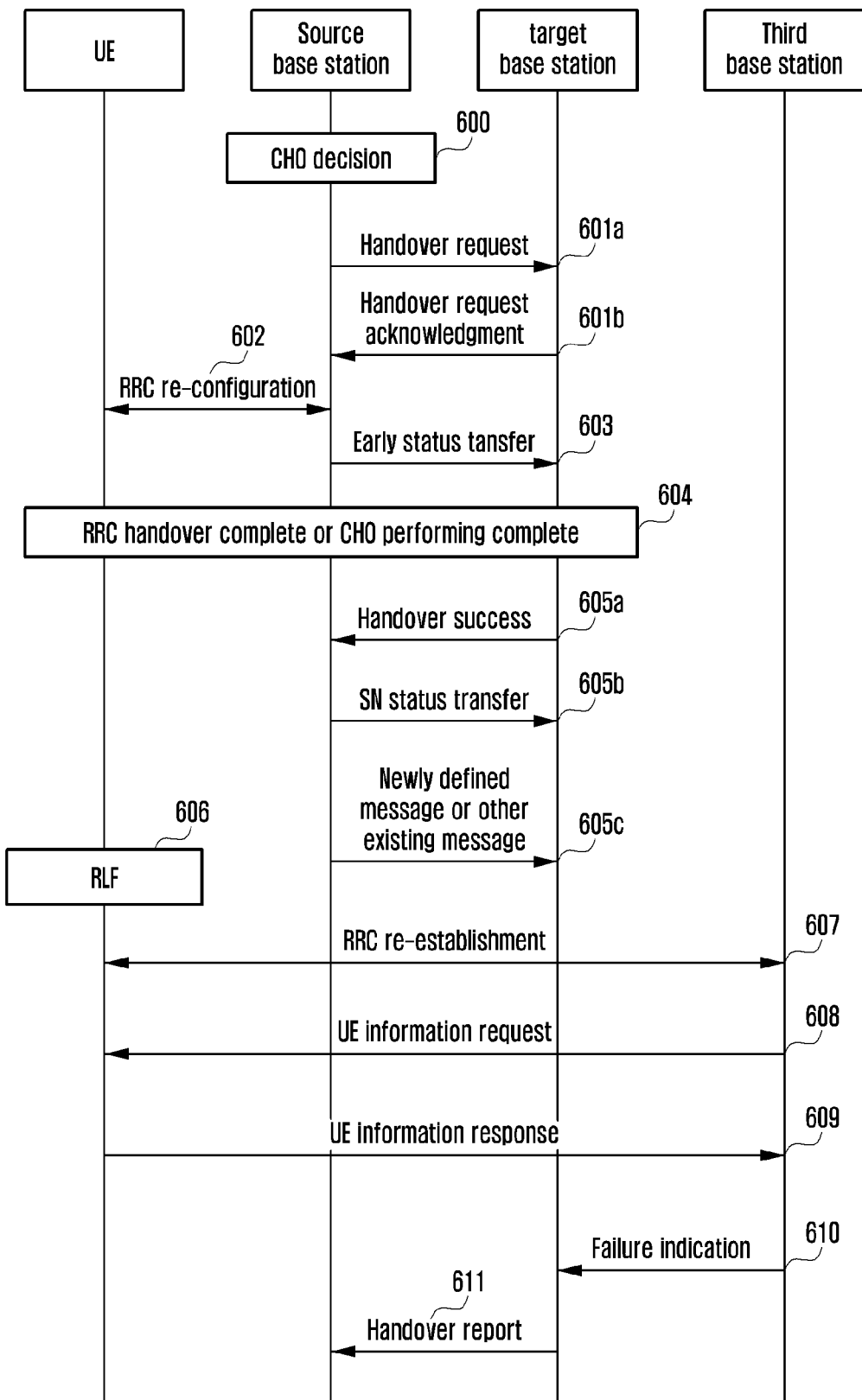
FIG. 6 illustrates a schematic diagram of an embodiment of the method one supporting self-configuration and self-optimization according to an exemplary embodiment of the present disclosure.

FIG. 6 illustrates a schematic diagram of an embodiment of the method one of supporting self-configuration and self-optimization according to an exemplary embodiment of the present disclosure. FIG. 6 omits and simplifies the detailed description of the steps not related to the present disclosure.

At step 600, a source base station decides to initiate a CHO handover.

At step 601a, the source base station transmits a handover request message to the target base station. The handover request message includes a CHO candidate cell list, a CHO execution condition(s), a CHO configuration information and/or a time from the CHO configuration to a latest or immediate handover command. The CHO candidate cell list includes all candidate cells for this CHO handover determined by the source base station, including all candidate cells on a target base station that receives the handover request message and the candidate cells on other potential target base stations. The information of each candidate cell includes a Cell Global Identifier. There may be one or more CHO execution conditions, which are the same as the CHO execution condition(s) that the source base station transmits to the UE through the RRC re-configuration. In the method of this embodiment, the CHO candidate cell list, the CHO execution condition(s), the CHO configuration information, and/or the time from the CHO configuration to the latest or immediate handover command may be transmitted to the target base station through this step, step 603, step 605b, or step 605c.

At step 601b, the target base station receives the handover request message the target base station saves the received the CHO candidate cell list, the CHO execution condition(s), the CHO configuration information, and/or the time from the CHO configuration to the latest or immediate handover command. The target base station transmits a handover request acknowledgment message to the source base station.

The above steps 601a and 601b need to be performed for each handover candidate cell.

At step 602, the source base station transmits a RRC re-configuration message to the UE. The message includes a CHO configuration and/or a CHO execution condition(s). The CHO execution condition(s) is the same as the CHO execution condition(s) transmitted to the target base station in step 601a. The UE transmits a RRC reconfiguration complete message to the source base station.

At step 603, the source base station transmits an early status transfer message to the target base station. The message may include a CHO candidate cell list, the CHO execution condition(s), the CHO configuration information, and/or the time from the CHO configuration to the latest or immediate handover command. The CHO candidate cell list and/or the CHO execution condition(s) are the same as those transmitted to the UE in the step 602. The meanings of the CHO candidate cell list, the CHO execution condition(s), the CHO configuration information, and/or the time from the CHO configuration to the latest or immediate handover command are the same as those described in the step 601a and will not be repeated here. The target base station saves the received information.

At Step 604, after receiving the CHO configuration, the UE maintains the connection with the source base station. The UE starts to evaluate the execution condition(s) of each candidate cell. If at least one candidate cell satisfies the CHO execution condition(s), the UE leaves the source cell, and the UE applies the corresponding configuration of the selected candidate cell, synchronizes to the selected candidate cell, transmits the RRC reconfiguration complete message to the target base station, and completes the RRC handover process or the CHO execution process.

At step 605a, the target base station transmits a handover success message to the source base station.

At step 605b, the source base station transmits a SN status transfer message to the target base station. The message may include the CHO candidate cell list, the CHO execution condition(s), the CHO configuration information, and/or the time from the CHO configuration to the latest or immediate handover command. The CHO candidate cell list and/or the CHO execution condition(s) are the same as those transmitted to the UE in the step 602. The meanings of the CHO candidate cell list, the CHO execution condition(s), the CHO configuration information, and/or the time from the CHO configuration to the latest or immediate handover command are the same as those described in the step 601a and will not be repeated here. The target base station saves the received information.

At step 605c, the CHO candidate cell list, the CHO execution condition(s), the CHO configuration information, and/or the time from the CHO configuration to the latest or immediate handover command may be transmitted to the target base station by defining a new message or using another existing message. The CHO candidate cell list and/or the CHO execution condition(s) are the same as those transmitted to the UE in the step 602. The meanings of the CHO candidate cell list, the CHO execution condition(s), the CHO configuration information, and/or the time from the CHO configuration to the latest or immediate handover command are the same as those described in the step 601a and will not be repeated here.

The target base station saves the received information. If the source base station transmits the above information to the target base station through the step 601a or the step 605b, this step may not be performed. In the method of the present disclosure, the CHO candidate cell list, the CHO execution condition(s), the CHO configuration information, and/or the time from the CHO configuration to the latest or immediate handover command may be transmitted to the target base station through different messages. For example, the time from the CHO configuration to the latest or immediate handover command is transmitted to the target base station through the handover request message, and the others are transmitted to the target base station through new messages at this step, and other situations are not limited by the present disclosure.

At step 606, a radio link failure occurs at the UE. The UE saves RLF report information. The content included in the RLF report is the same as the content described in the step 302 and will not be repeated here.

At step 607, the UE succeeds in the RRC re-establishment with the third base station, or UE succeeds in the RRC connection setup with the third base station. The RRC re-establishment complete or the RRC establishment complete message includes indication information that the UE has the RLF report.

At step 608, the third base station transmits a UE information request message to the UE, requesting the RLF report.

At step 609, the UE transmits a UE information response message to the third base station. The message includes the RLF report. The content included in the RLF report is the same as the content described in the step 302 and will not be repeated here.

At step 610, the third base station transmits a failure indication message to the base station last serving the UE. According to one embodiment, the third base station determines the base station last serving the UE according to the RLF report. For the case of the RLF failure, the base station last serving the UE is the base station where the failed primary cell is. For the case of the handover failure, the base station last serving the UE is the source base station which triggered the latest handover, which is the base station where the previous primary cell is. In this embodiment, the base station serving last the UE is the target base station of the previous successful handover. Since the target base station will no longer play the role of the target base station for the UE after the step 610, the target base station is called the second base station after the step 610 in this embodiment.

The second base station detects the reason for the occurrence of the failure, and the specific determination method is the same as that in the step 302, which will not be repeated here. According to the method in the step 302, in this embodiment, three is a recent CHO execution before the occurrence of the failure, for example, according to the indication of the CHO execution or according to that the time from the CHO execution to the occurrence of the failure is smaller than a configured threshold, the first RRC re-establishment attempt cell after the failure or the cell where the UE successfully establishes the RRC connection is not the cell that served the UE at the last handover initialization, nor the cell that served the UE where the RLF happened or the target cell of the CHO handover execution. Therefore, the reason for the failure for the UE is a CHO to a wrong cell or a CHO execution to a wrong cell.

The second base station may further determine whether it is because of an inappropriate configuration of the CHO candidate cell and transmit the information of the inappropriate configuration of the CHO candidate cell to the source base station which triggered the last handover through a handover report in the step 611. The specific determination method is the same as that in the step 302 and will not be repeated here. Or the source base station which triggered the last handover determines whether it is because of the inappropriate configuration of the CHO candidate cell according to one or more of the types of the received handover report, the UE RLF report, the CHO candidate cell list, the CHO execution condition(s), the CHO configuration information, and/or the time from the CHO configuration to the latest or immediate handover command in step 611. The specific determination method is the same as that in the step 302 and the step 303 and will not be repeated here.

At step 611, the second base station transmits the handover report message to the source base station which triggered the last handover. The content included in the message is the same as that of the step 303 and will not be repeated here. In this embodiment, the type of the handover report may be a CHO to a wrong cell or a CHO execution to a wrong cell.

The source base station confirms the reason for the occurrence of the failure according to the received message. The specific method is the same as that in the step 303 and will not be repeated here.

So far, the description of an embodiment of the method one of supporting self-configuration and self-optimization of the present disclosure is completed. This method may support robustness of a handover in an enhanced mobility process, correctly identify a reason for an occurrence of a failure, to perform optimization in appropriate way, reduce the occurrence of the failure, ensure service continuity, and reduce operators' labour cost.

Figure 7:
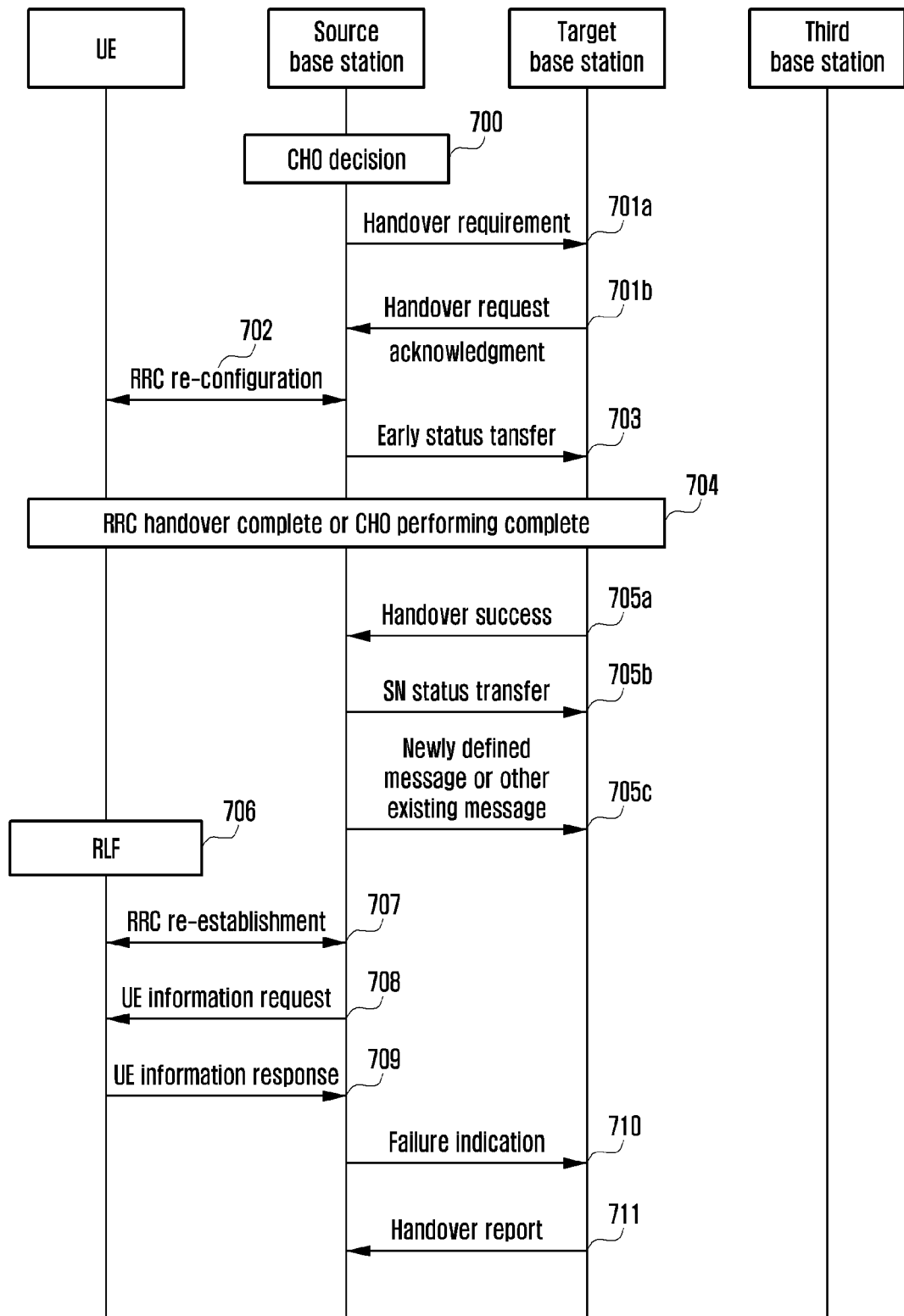
FIG. 7 illustrates a schematic diagram of another embodiment of the method one supporting self-configuration and self-optimization according to an exemplary embodiment of the present disclosure.

FIG. 7 illustrates a schematic diagram of another embodiment of the method one supporting self-configuration and self-optimization according to an exemplary embodiment of the present disclosure. FIG. 7 omits and simplifies the detailed description of the steps not related to the present disclosure.

Steps 700 to step 706 are the same as step 600 to step 606 and will not be repeated here.

At step 707, the UE succeeds the RRC re-establishment at the source base station. Or the UE succeeds the RRC connection setup at the source base station. The RRC re-establishment complete or the RRC establishment complete message includes the indication information that the UE has a RLF report. After the UE's CHO handover succeeds, the source base station will no longer play the role of the source base station for the UE, so in this embodiment, the source base station is also called the first base station, which is the source base station of the previous CHO handover.

At step 708, the first base station transmits a UE information request message to the UE, requesting the RLF report.

At step 709, the UE transmits a UE information response message to the first base station. The message includes the RLF report. The content included in the RLF report is the same as in the step 302 and will not be repeated here.

At step 710, the first base station transmits a failure indication message to a last base station serving the UE. According to the RLF report, the first base station determines the last base station serving the UE. For the case of the RLF failure, the last base station serving the UE is the base station where the failed primary cell is. For the case of the handover failure, the last base station serving the UE is the source base station which triggered the latest handover, which is the base station where the previous primary cell is. In this embodiment, the last base station serving the UE is the target base station of the previous successful handover. Since the target base station will no longer play the role of the target base station for the UE after the step 710, the target base station will be referred to as the second base station after the step 670 in this embodiment.

The second base station detects the reason for the occurrence of the failure, and the specific determination method is the same as that in the step 302, which will not be repeated here. According to the method in step 302, in this embodiment, there is a recent CHO execution before the occurrence of the failure, for example, according to the indication of the CHO execution or according to that the time from the CHO execution to the occurrence of the failure is smaller than a configured threshold, and the first RRC re-establishment attempt cell after the failure or the cell where the UE attempts the RRC connection setup or the cell where the UE successfully establishes the RRC connection is the cell that served the UE at the last handover initialization, then the reason for the occurrence of the failure is a too early CHO execution.

At step 711, the second base station transmits a handover report message to the source base station which triggered the last handover. The content included in the message is the same as that of the step 303 and will not be repeated here. In this embodiment, the type of the handover report may be a too early CHO execution.

The source base station confirms the reason for the occurrence of the failure according to the received message. The specific method is the same as that in the step 303 and will not be repeated here.

So far, the description of another embodiment of the method one of supporting self-configuration and self-optimization of the present disclosure is completed. This method may support robustness of a handover in an enhanced mobility process, correctly identify a reason for an occurrence of a failure, to perform optimization in appropriate way, reduce the occurrence of the failure, ensure service continuity, and reduce operators' labour cost.

Figure 8:
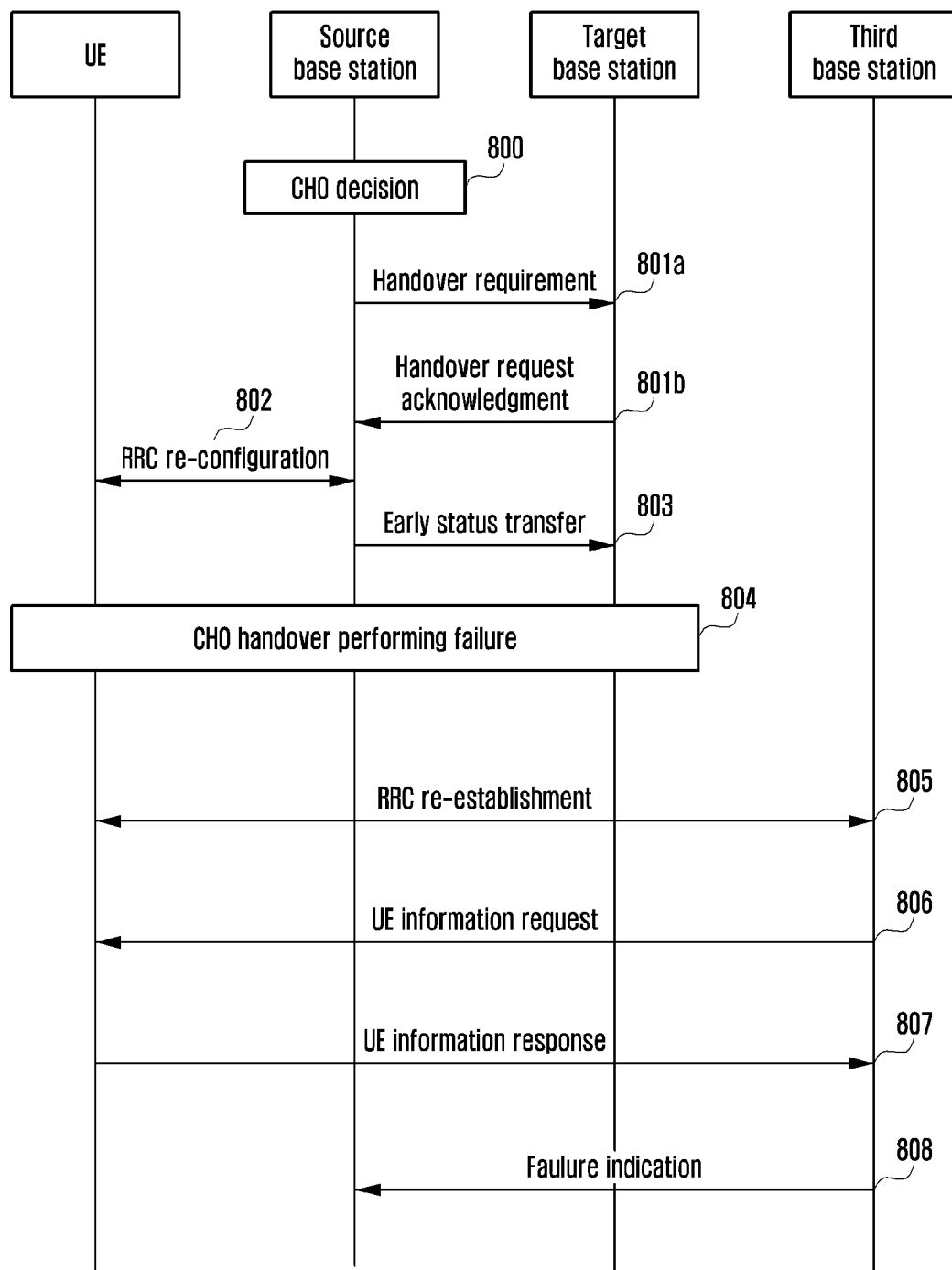
FIG. 8 illustrates a schematic diagram of an embodiment of the method two supporting self-configuration and self-optimization according to an exemplary embodiment of the present disclosure.

FIG. 8 illustrates a schematic diagram of an embodiment of the method two of supporting self-configuration and self-optimization according to an exemplary embodiment of the present disclosure. FIG. 8 omits and simplifies the detailed description of the steps not related to the present disclosure.

Steps 800 to step 803 are the same as step 600 to step 603 and will not be repeated here.

At step 804, after receiving the CHO configuration, the UE maintains the connection with the source base station. The UE starts to evaluate the execution condition(s) of each candidate cell. If at least one candidate cell satisfies the CHO execution condition(s), the UE leaves the source cell, and the UE applies the corresponding configuration of the selected candidate cell and performs synchronization to the selected candidate cell. That the synchronization process fails results in that the CHO handover execution fails.

Since the target base station will no longer play the role of the target base station for the UE after the step 804, the target base station will be referred to as the second base station after the step 804 in this embodiment.

The UE saves the RLF report information. The content included in the RLF report is the same as the content described in the step 302 and will not be repeated here.

At step 805, UE succeeds in the RRC re-establishment with the third base station, or UE succeeds in the RRC connection setup with the third base station, or UE succeeds in the CHO recovery at the third base station. The RRC re-establishment complete or the RRC establishment complete or the RRC re-configuration complete message includes the indication information that the UE has the RLF report. This embodiment is also applicable to the case that the cell where the RRC re-establishment is successful or the RRC connection setup is successful or the CHO recovery is successful is a cell other than a candidate cell for the CHO execution on the second base station. In this case, steps 805 to 807 are processes between the second base station and the UE. Step 808 is a process between the second base station and the source base station.

At step 806, the third base station transmits a UE information request message to the UE, requesting the RLF report.

At step 807, the UE transmits a UE information response message to the third base station. The message includes the RLF report. The content included in the RLF report is the same as in the step 302 and will not be repeated here.

At step 808, the third base station transmits a failure indication message to the last base station serving the UE. According to the RLF report, the third base station determines the last base station serving the UE. For the case of the RLF failure, the last base station serving the UE is the base station where the failed primary cell is. For the case of the handover failure, the last base station serving the UE is the source base station tri which triggered the latest handover, which is the base station where the previous primary cell is. In this embodiment, the last base station serving the UE is the source base station which triggered the latest handover, that is, the base station where the previous primary cell is.

The source base station detects the reason for the occurrence of the failure, and the specific determination method is the same as that in the step 302, which will not be repeated here. According to the method in the step 302, in this embodiment, there is a recent CHO execution before the occurrence of the failure, for example, according to the indication of the CHO execution or according to that the time from the CHO execution to the occurrence of the failure is smaller than a configured threshold, the first RRC re-establishment attempt cell after the failure or the cell where the UE successfully establishes the RRC connection is not the cell that served the UE at the last handover initialization, nor the cell that served the UE where the RLF happened or the target cell of the CHO handover execution. Therefore, the reason for the failure occurred at the UE is a CHO to a wrong cell or CHO execution to a wrong cell.

The source base station may further determine whether it is because of an inappropriate configuration of the CHO candidate cell. The specific determination method is the same as that in the step 302 and will not be repeated here.

The source base station performs optimization according to the detected reason for the occurrence of the failure.

At this point, the description of an embodiment of the method two for supporting self-configuration and self-optimization of the present disclosure is completed. This method may support robustness of a handover in an enhanced mobility process, correctly identify a reason for an occurrence of a failure, to perform optimization in appropriate way, reduce the occurrence of the failure, ensure service continuity, and reduce operators' labour cost.

Figure 9:
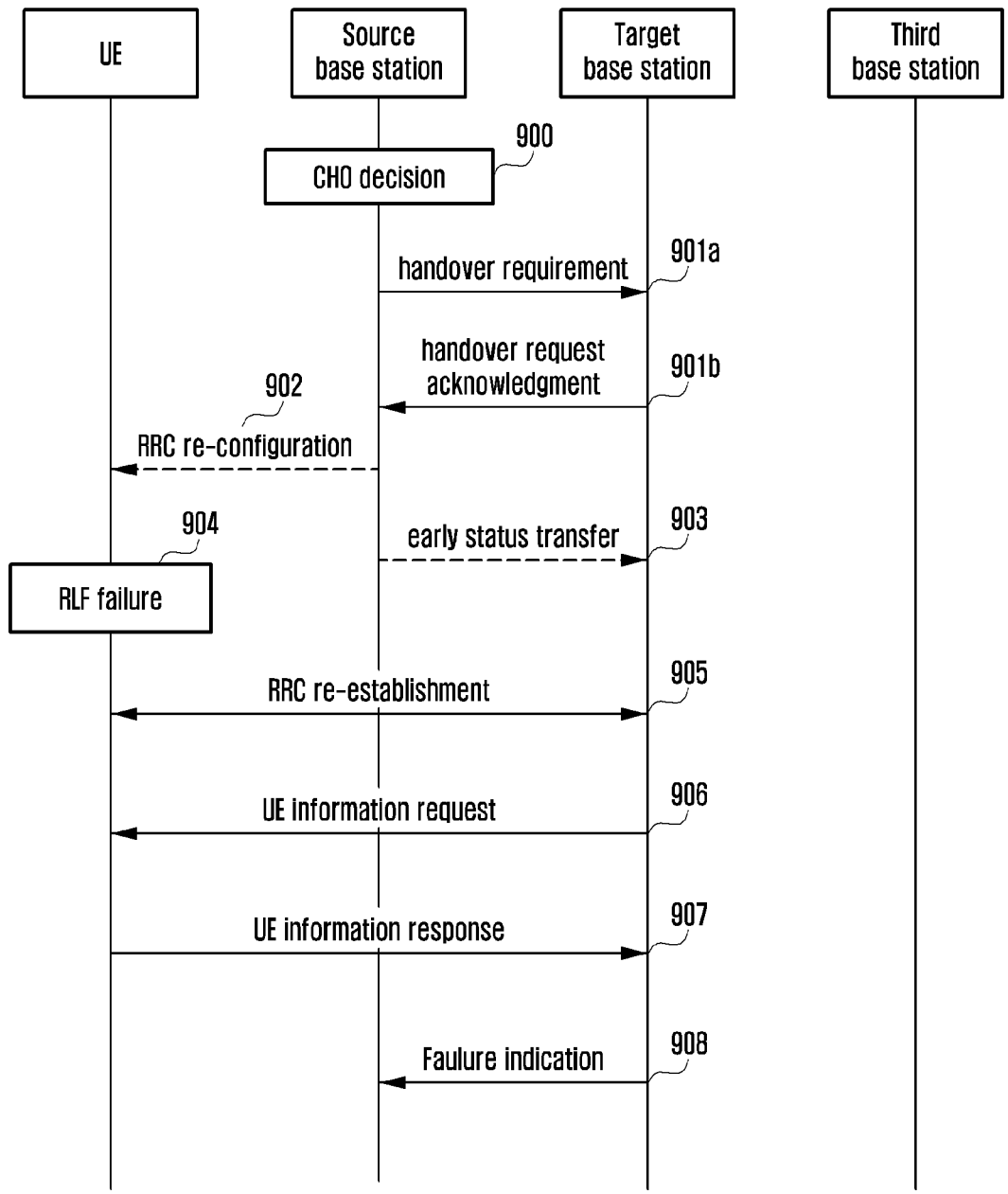
FIG. 9 illustrates a schematic diagram of another embodiment of the method two supporting self-configuration and self-optimization according to an exemplary embodiment of the present disclosure.

FIG. 9 illustrates a schematic diagram of another embodiment of the method to supporting self-configuration and self-optimization according to an exemplary embodiment of the present disclosure. FIG. 9 omits and simplifies the detailed description of the steps not related to the present disclosure.

At step 900 to step 901b are the same as step 600 to step 601b and will not be repeated here.

At step 903, the source base station transmits a RRC re-configuration message to the UE. The message includes the CHO candidate cell, the CHO execution condition(s), and/or the CHO configuration information. This embodiment includes a scenario where the source base station transmits the RRC re-configuration message to the UE or a scenario where the source base station has not transmitted the RRC re-configuration message to the UE and is applicable to both scenarios. Corresponding to the scenario where the source base station has transmitted the RRC re-configuration message to the UE, the step 903 may also be performed, and the step 903 is the same as the step 603 and will not be repeated here.

At step 904, the UE does not receive the RRC re-configuration message, or the UE receives the RRC re-configuration message but the candidate cell does not satisfy the CHO execution condition(s) and therefore the CHO is not executed, and the radio link failure occurs at the UE. The UE saves the RLF report information. The content included in the RLF report is the same as that in the step 302 and will not be repeated here.

At step 905, the UE succeeds in the RRC re-establishment with the target base station, or UE succeeds in the RRC connection setup at the target base station. The RRC re-establishment complete or the RRC establishment complete message includes the indication information that the UE has the RLF report.

At step 906, the target base station transmits a UE information request message to the UE, requesting the RLF report.

At step 907, the UE transmits a UE information response message to the target base station. The message includes the RLF report. The content included in the RLF report is the same as that in the step 302 and will not be repeated here.

At step 908, the target base station transmits the failure indication message to the source base station. According to the RLF report, the target base station determines the last base station serving the UE. For the case of the RLF failure, the last base station serving the UE is the base station where the failed primary cell is. For the case of the handover failure, the last base station serving the UE is the source base station which triggered the latest handover, which is the base station where the previous primary cell is. In this embodiment, the last base station serving the UE is the source base station which triggered the latest handover, that is, the base station where the previous primary cell is.

The source base station detects the reason for the occurrence of the failure, and the specific determination method is the same as that in the step 302, which will not be repeated here. According to the method in the step 302, in this embodiment, there is no recent CHO execution before the failure occurs, for example, it is determined that a recent CHO execution does not exist before the failure occurs, according to that the UE RLF report does not include the indication of the CHO execution or the value of the indication of the CHO execution is no CHO execution, the UE RLF report does not include a time from the CHO execution to the occurrence of the failure or the time from the CHO execution to the occurrence of the failure is greater than a configured threshold, then the reason for the occurrence of the failure is a too late CHO or a too late CHO execution.

The source base station performs corresponding optimization according to the detected reason for the occurrence of the failure.

So far, the description of another embodiment of the method two of supporting self-configuration and self-optimization of the present disclosure is completed. This method may support robustness of a handover in an enhanced mobility process, correctly identify a reason for an occurrence of a failure, to perform optimization in appropriate way, reduce the occurrence of the failure, ensure service continuity, and reduce operators' labour cost.

Figure 10:
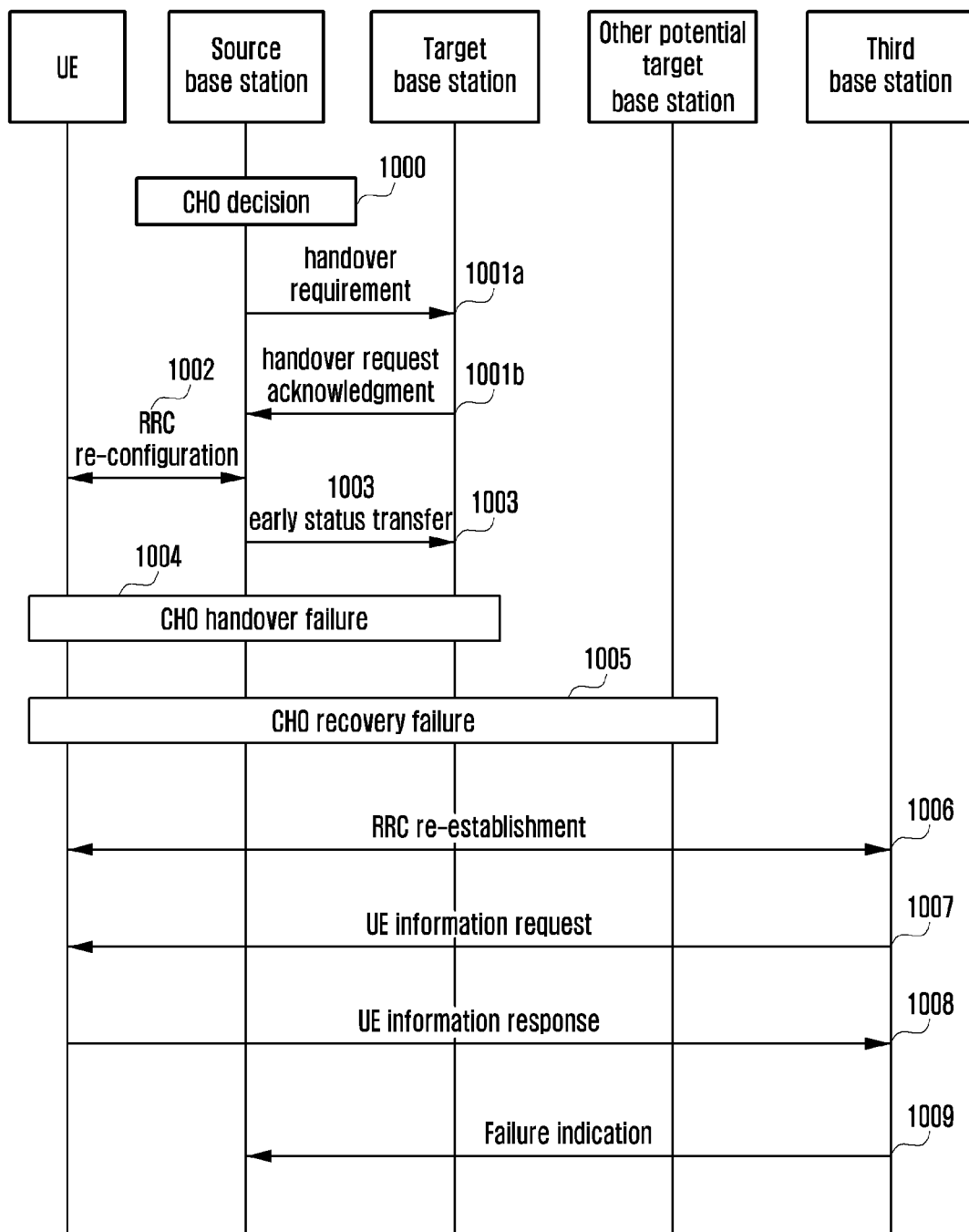
FIG. 10 illustrates a schematic diagram of still another embodiment of the method two supporting self-configuration and self-optimization according to an exemplary embodiment of the present disclosure.

FIG. 10 illustrates a schematic diagram of yet another embodiment of the method to supporting self-configuration and self-optimization according to an exemplary embodiment of the present disclosure. FIG. 10 omits and simplifies the detailed description of the steps not related to the present disclosure.

Step 1000 to step 1004 are the same as step 800 to step 804 and will not be repeated here.

At step 1005, the UE performs cell reselection, and the reselected cell is a cell in the CHO candidate cell list, and the UE performs CHO recovery. The CHO recovery fails.

The UE saves an RLF report. The RLF report may be one RLF report information but includes information of two failures, for example, including two cell identifiers of the cells where the two failures occur, that is, the cell identifier of the CHO handover execution failure and the cell identifier of the cell where the CHO recovery fails. The RLF report may further include the time from receiving the RRC re-configuration to the CHO handover execution failure and the time from receiving the RRC re-configuration to the CHO recovery failure. It may include the time from the CHO handover execution to the performing failure and the time from the CHO handover execution to the CHO recovery failure. There may be two RLF reports, corresponding to the information of two failures respectively. The content included in the two RLF reports is specifically the same as that in the step 302 and will not be repeated here.

Steps 1006 to 1008 are the same as steps 805 to 807 and will not be repeated here.

At step 1009, the third base station transmits a failure indication message to the source base station. According to the RLF report, the third base station determines the last base station serving the UE. For the case of the RLF failure, the last base station serving the UE is the base station where the failed primary cell is. For the case of the handover failure, the last base station serving the UE is the source base station which triggered the latest handover, which is the base station where the previous primary cell is. In this embodiment, the last base station serving the UE is the source base station which triggered the latest handover, that is, the base station where the previous primary cell is.

The source base station detects the reason for the occurrence of the failure, and the specific determination method is the same as that in the step 302, which will not be repeated here. According to the method in step 302, in this embodiment, there is a recent CHO execution before the occurrence of the failure, for example, according to the indication of the CHO execution or according to that the time from the CHO execution to the occurrence of the failure is smaller than a configured threshold, the first RRC re-establishment attempt cell after the failure or the cell where the UE successfully establishes the RRC connection is not the cell that served the UE at the last handover initialization, nor the cell that served the UE where the RLF happened or the target cell of the CHO handover execution. Therefore, the reason for the failure occurred at the UE is a CHO to a wrong cell or a CHO execution to a wrong cell.

The source base station may further determine whether it is because of an inappropriate configuration of the CHO candidate cell. The specific determination method is the same as that in the step 302 and will not be repeated here.

The source base station performs optimization according to the detected reason for the occurrence of the failure.

So far, the description of another embodiment of the method two for supporting self-configuration and self-optimization of the present disclosure is completed. This method may support robustness of a handover in an enhanced mobility process, correctly identify a reason for an occurrence of a failure, to perform optimization in appropriate way, reduce the occurrence of the failure, ensure service continuity, and reduce operators' labour cost.

Figure 11:
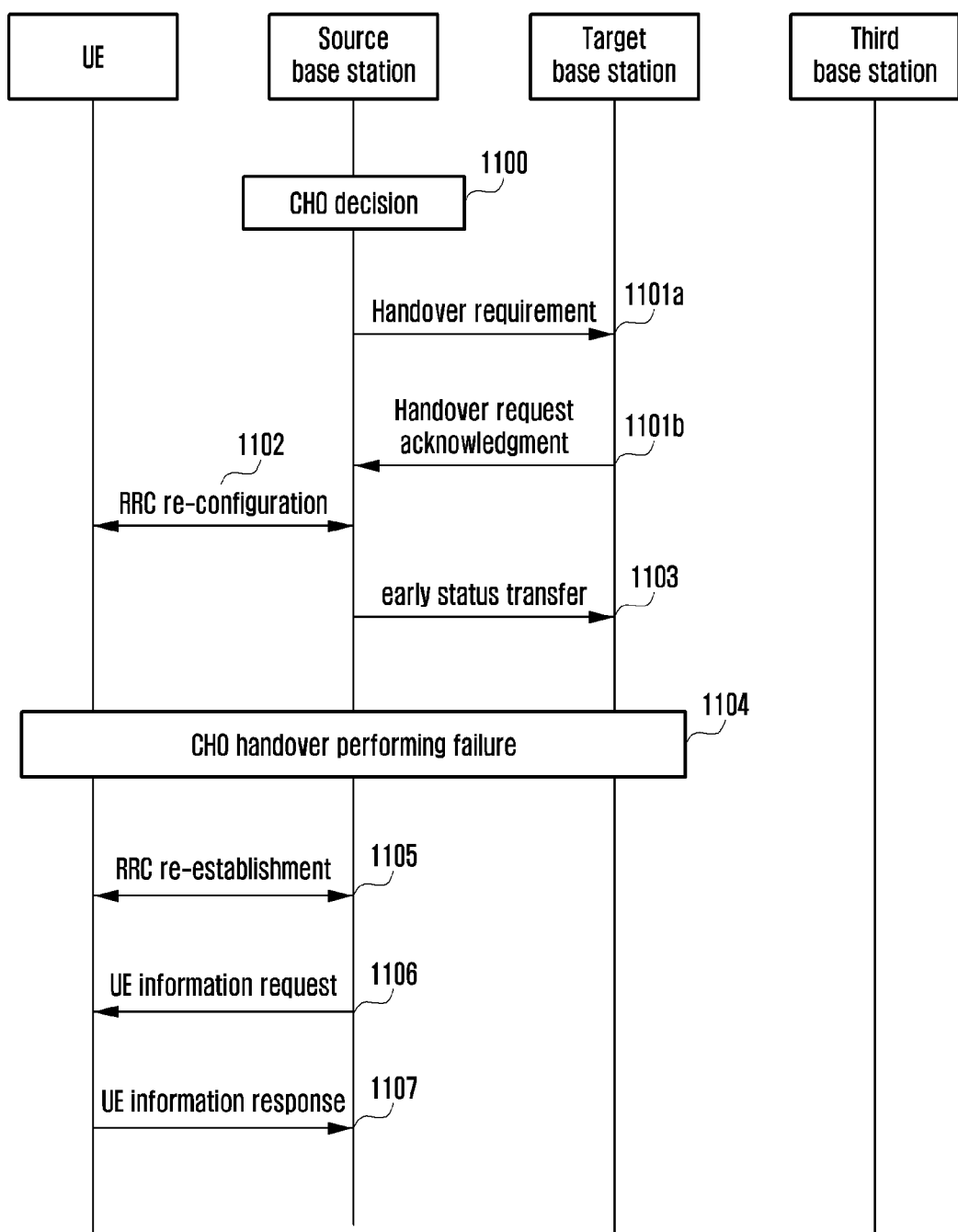
FIG. 11 illustrates a schematic diagram of an embodiment of the method three supporting self-configuration and self-optimization according to an exemplary embodiment of the present disclosure.

FIG. 11 illustrates a schematic diagram of an embodiment of the method three supporting self-configuration and self-optimization according to an exemplary embodiment of the present disclosure. FIG. 11 omits and simplifies the detailed description of the steps not related to the present disclosure.

At steps 1101 to 1104 are the same as steps 801 to 804 and will not be repeated here.

At step 1105, the UE succeeds in the RRC re-establishment with the source base station, or the UE succeeds in the RRC connection setup at the source base station. The RRC re-establishment complete or the RRC establishment complete message includes the indication information that the UE has the RLF report.

At step 1106, the source base station transmits a UE information request message to the UE, requesting the RLF report.

At step 1107, the UE transmits a UE information response message to the source base station. The message includes the RLF report. The content included in the RLF report is the same as in the step 302 and will not be repeated here.

The source base station detects the reason for the occurrence of the failure, and the specific determination method is the same as that in the step 302, which will not be repeated here. According to the method in step 302, in this embodiment, there is a recent CHO execution before the occurrence of the failure, for example, according to the indication of the CHO execution or according to that the time from the CHO execution to the occurrence of the failure is smaller than a configured threshold, and the first RRC re-establishment attempt cell after the failure or the cell where the UE attempts the RRC connection setup or the cell where the UE successfully establishes the RRC connection is the cell that served the UE at the last handover initialization, then the reason for the occurrence of the failure is a too early CHO execution.

The source base station performs optimization according to the detected reason for the occurrence of the failure.

So far, the description of an embodiment of the method three of supporting self-configuration and self-optimization of the present disclosure is completed. This method may support robustness of a handover in an enhanced mobility process, correctly identify a reason for an occurrence of a failure, to perform optimization in appropriate way, reduce the occurrence of the failure, ensure service continuity, and reduce operators' labour cost.

Figure 12:
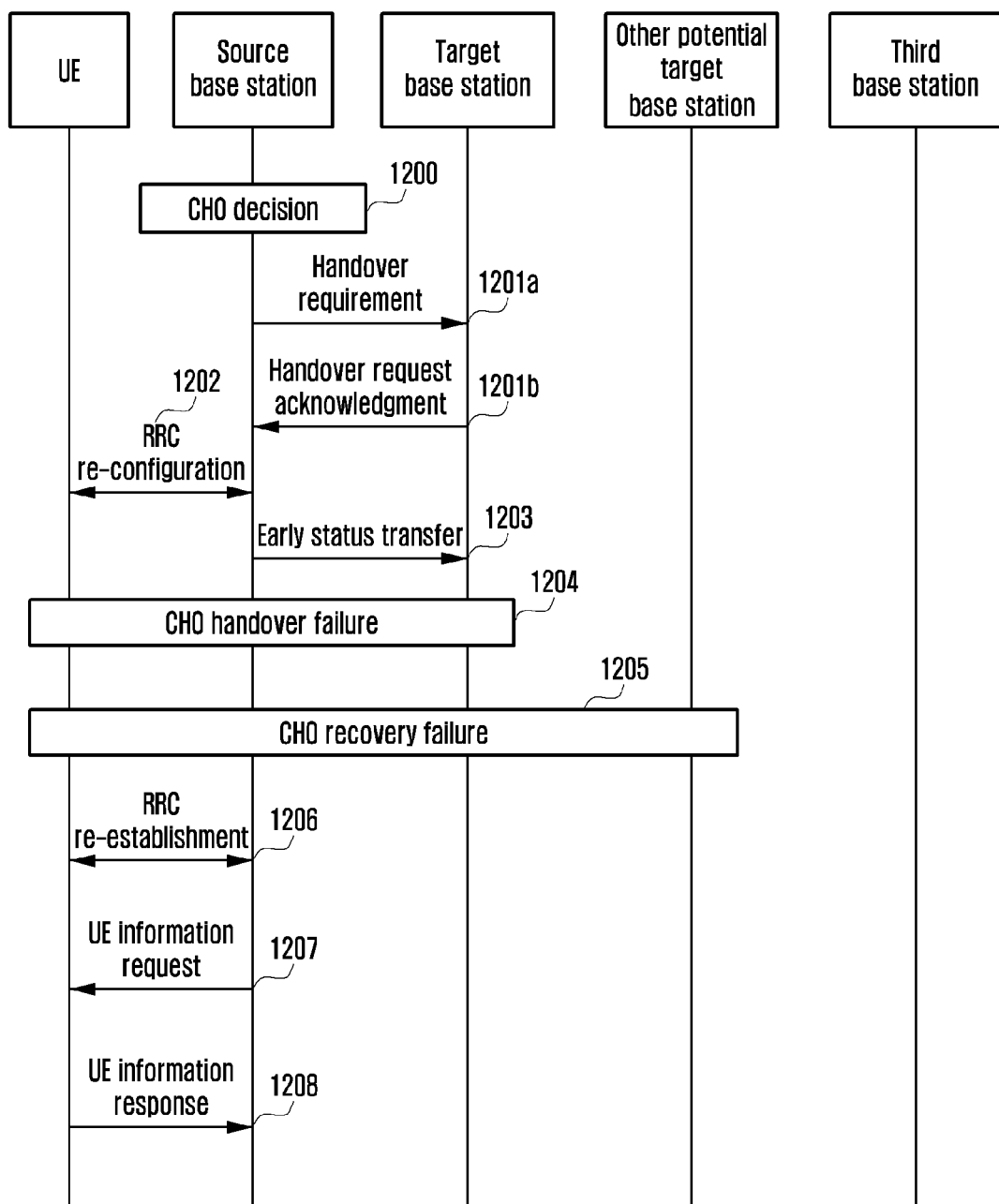
FIG. 12 illustrates a schematic diagram of another embodiment of the method three supporting self-configuration and self-optimization according to an exemplary embodiment of the present disclosure.

FIG. 12 illustrates a schematic diagram of another embodiment of the method three supporting self-configuration and self-optimization according to an exemplary embodiment of the present disclosure. FIG. 12 omits and simplifies the detailed description of the steps not related to the present disclosure.

At step 1200 to step 1205 are the same as step 1000 to step 1005 and will not be repeated here.

At step 1206, the UE succeeds in the RRC re-establishment with the source base station, or the UE succeeds in the RRC connection setup at the source base station. The RRC re-establishment complete or the RRC establishment complete message includes the indication information that the UE has the RLF report.

At step 1207, the source base station transmits a UE information request message to the UE, requesting the RLF report.

At step 1207, the UE transmits a UE information response message to the source base station. The message includes the RLF report. The RLF report may be one RLF report but includes the information of two failures or may be two RLF reports. The specific content is the same as that described in the step 302 and step 1005 and will not be repeated here.

The source base station detects the reason for the occurrence of the failure, and the specific determination method is the same as that in the step 302, which will not be repeated here. According to the method in step 302, in this embodiment, there is a recent CHO execution before the occurrence of the failure, for example, according to the indication of the CHO execution or according to that the time from the CHO execution to the occurrence of the failure is smaller than a configured threshold, and the first RRC re-establishment attempt cell after the failure or the cell where the UE attempts the RRC connection setup or the cell where the UE successfully establishes the RRC connection is the cell that served the UE at the last handover initialization, then the reason for the occurrence of the failure is a too early CHO execution.

The source base station performs corresponding optimization according to the detected reason for the occurrence of the failure.

So far, the description of another embodiment of the method three of supporting self-configuration and self-optimization of the present disclosure is completed. This method may support robustness of a handover in an enhanced mobility process, correctly identify a reason for an occurrence of a failure, to perform optimization in appropriate way, reduce the occurrence of the failure, ensure service continuity, and reduce operators' labour cost.

Figure 13:
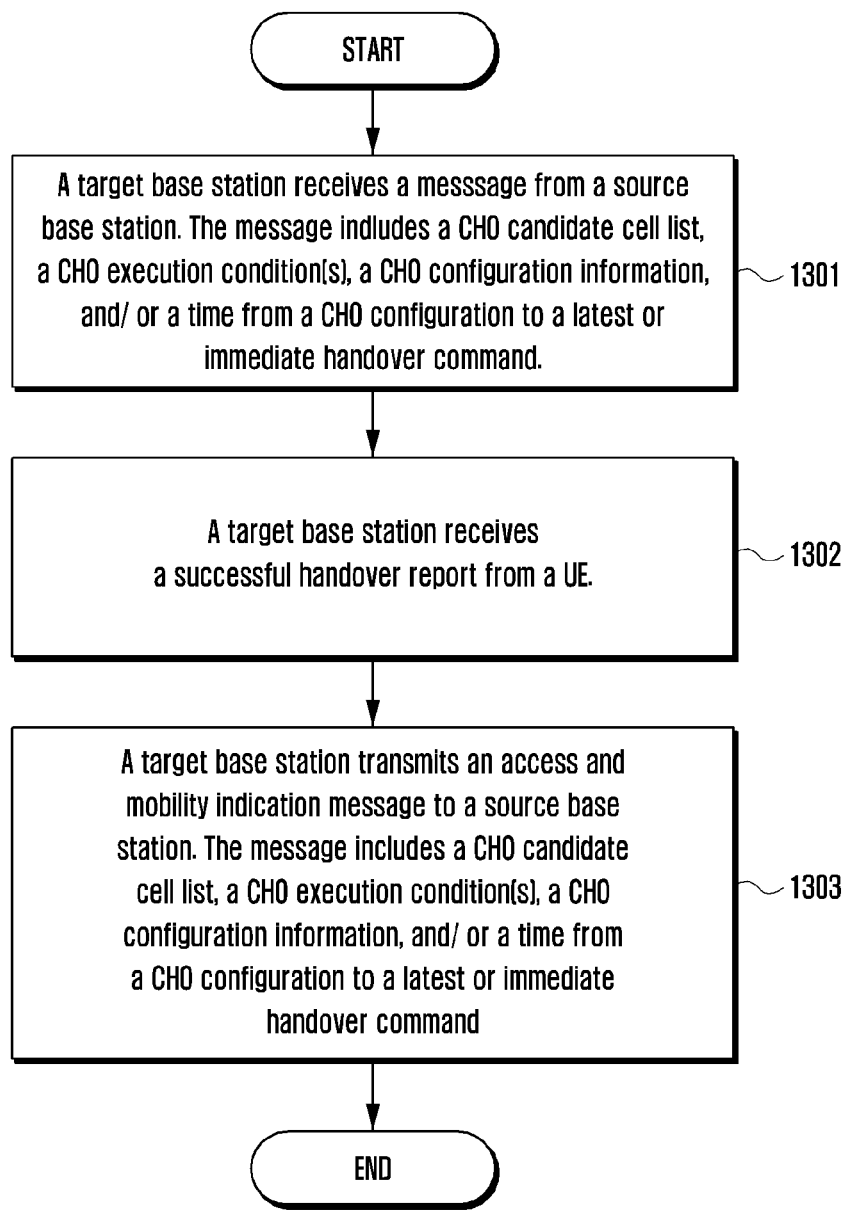
FIG. 13 illustrates a flowchart of a method four supporting self-configuration and self-optimization according to an exemplary embodiment of the present disclosure.

FIG. 13 illustrates a flowchart of a method four supporting self-configuration and self-optimization according to an exemplary embodiment of the present disclosure.

At step 1301, the target base station receives a message from the source base station. The message includes information about the CHO candidate cell list and/or the CHO execution condition(s). The message further includes the CHO configuration information and/or the time from the CHO configuration to the latest or immediate handover command. The CHO configuration is the CHO configuration transmitted by the source base station to the UE. The handover command is the handover command message latest to/immediately following the CHO configuration and is used to trigger a normal handover. The message may be a handover request message, an early status transfer message, a sequence number (SN) status transfer message, a newly defined message, or another existing message. The message may be transmitted by the source base station to the target base station in a handover preparation phase or transmitted to the target base station after the source base station receives the handover success message or transmitted to the target base station at other times, which is not limited by the present disclosure.

The target base station may receive the above information from the source base station through a same message(s) or different messages. The target base station saves the received information. The CHO candidate cell list includes all candidate cells for this CHO handover determined by the source base station, including all candidate cells on the target base station that receives the message and candidate cells on other potential target base stations. The information of each candidate cell includes a Cell Global Identifier. There may be one or more the CHO execution condition(s)s, which are the same as the CHO execution condition(s) transmitted by the source base station to UE through the RRC re-configuration message. The source base station transmits the above information to the target base station through an inter-base station interface message or transmits the above information to the target base station through the core network. The specific method is the same as that in the step 301 and will not be repeated here.

At step 1302, the target base station receives a successful handover report from the UE. The successful handover report may be one or more. The target base station receives the successful handover report from the UE after the UE successfully hands over to the target base station. After the UE has successfully handed over to the target base station, it may inform the target base station that there is the successful handover report information through the RRC reconfiguration complete message or other messages. The target base station requests the UE's successful handover report, and the UE transmits the successful handover report to the target base station. The successful handover report at least includes one or more of the followings:

An identifier of a source cell, a cell global identifier of a cell in which a last RRC re-configuration message is transmitted, further including a tracking area code (TAC) of the cell;

A primary cell identifier of a target cell, further including a TAC or TAI of the cell;

A cell radio network temporary identifier (C-RNTI), the C-RNTI used in a source cell;

A type of a failure, such as a beam detection failure or other failures; and

A measurement result of a UE. The measurement result includes the measurement result for a serving cell, a CHO candidate cell, and/or a neighbouring cell. For a cell that satisfies the execution condition(s), the information further includes an indication information that the execution condition(s) is satisfied. The measurement result includes a measurement result when a handover is triggered, a measurement result when a CHO configuration is received, a measurement result at a CHO execution, a measurement result when a handover is performed, a measurement result when a failure occurs, a measurement result after a handover is performed, and/or a measurement result at handover completion.

The target base station perform optimization using the received information, such as optimizing dedicated RACH resources or beam resources.

At step 1303, the target base station transmits an access and mobility indication message to the source base station. The message includes a successful handover report. The message may further include the handover type, the CHO candidate cell list, the CHO execution condition(s), the CHO configuration information, and/or the time from the CHO configuration to the latest or immediate handover command. The CHO candidate cell list, the CHO execution condition (s), the CHO configuration information, and/or the time from the CHO configuration to the latest or immediate handover command information are received from the source base station in the step 1301. The CHO candidate cell list includes all candidate cells for this CHO handover. The handover type includes a normal handover, a CHO handover, a DAPS handover, and so on.

The source base station analyses whether the mobility configuration needs to be adjusted according to the received information. If necessary, the source base station optimizes the mobility or handover parameters in appropriate way.

The method four of supporting self-configuration and self-optimization of the present disclosure is shown in an exemplary manner above. Through the above method four, it is possible to support robustness of a handover in an enhanced mobility process, correctly identify a reason for an occurrence of a failure, to perform optimization in appropriate way, reduce the occurrence of the failure, ensure service continuity, and reduce operators' labour cost.

Figure 14:
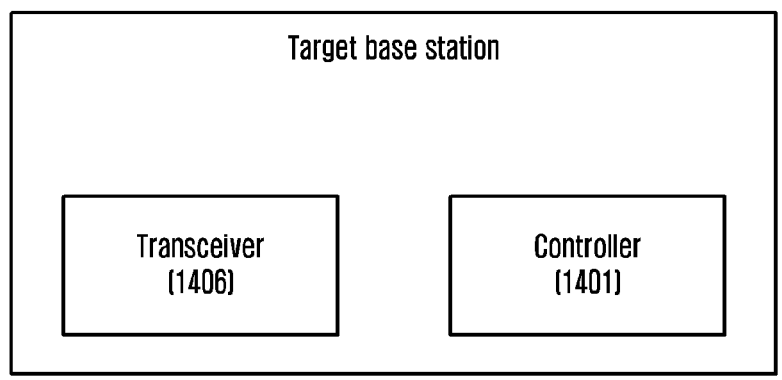
FIG. 14 illustrates a block diagram of a target base station according to an exemplary embodiment of the present disclosure.

FIG. 14 illustrates a block diagram of a target base station according to an exemplary embodiment of the present disclosure.

Referring to FIG. 14, a target base station 1400 may include a controller 1401 and a transceiver 1406. According to an embodiment of the present disclosure, the controller 1401 may be defined as a circuit-specific integrated circuit or at least one processor. The controller 1401 may control the overall operation of the target base station and control the target base station to implement various methods provided in the present disclosure.

The transceiver 1406 may transmit/receive signals to/from other network entities (such as but not limited to the source base station, the third base station, the user equipment) wiredly or wirelessly. For example, the transceiver 1406 may transmit signals to and receive signals from the user equipment.

Figure 15:
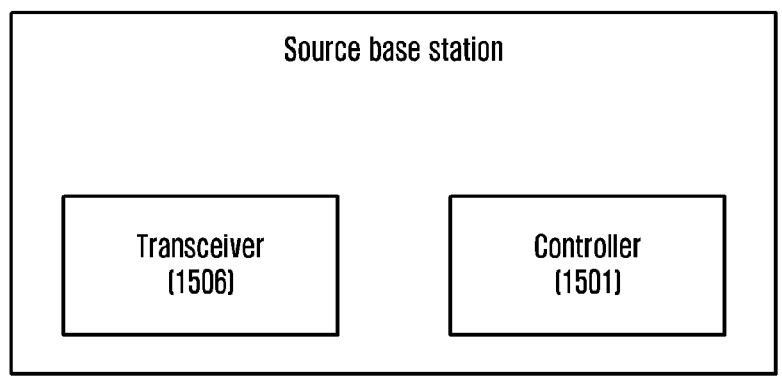
FIG. 15 illustrates a block diagram of a source base station according to an exemplary embodiment of the present disclosure.

FIG. 15 illustrates a block diagram of a source base station according to an exemplary embodiment of the present disclosure.

Referring to FIG. 15, a source base station 1500 may include a controller 1501 and a transceiver 1506. According to an embodiment of the present disclosure, the controller 1501 may be defined as a circuit-specific integrated circuit or at least one processor. The controller 1501 may control the overall operation of the source base station and control the source base station to implement various methods provided in the present disclosure.

The transceiver 1506 may send/receive signals to/from other network entities (such as but not limited to the target base station, the third base station, the user equipment) wiredly or wirelessly. For example, the transceiver 1506 may transmit signals to and receive signals from the user equipment.

Those skilled in the art will understand that the various illustrative logical blocks, modules, circuits, and steps described in this application may be implemented as hardware, software, or a combination thereof. To clearly illustrate this interchangeability of hardware and software, various illustrative components, blocks, modules, circuits, and steps are generally described above in the form of their function sets. Whether such a function set is implemented as hardware or software depends on the specific application and design constraints imposed on the overall system. The skilled in the art can implement the described function sets in different ways for each specific application, but such design decisions should not be interpreted as causing a departure from the scope of this application.

The various illustrative logic blocks, modules, and circuits described in this disclosure can be implemented or performed by general-purpose processors, digital signal processors (DSPs), application specific integrated circuits (ASICs), field programmable gate arrays (FPGAs) or other programmable logic devices, discrete gates or transistor logics, discrete hardware components, or any combination thereof designed to perform any combination of the functions described herein. A general-purpose processor may be a microprocessor, but in the alternative, the processor may be any conventional processor, controller, microcontroller, or state machine. The processor may also be implemented as a combination of computing devices, such as a combination of a DSP and a microprocessor, multiple microprocessors, one or more microprocessors that cooperate with a DSP core, or any other such configuration.

The steps of the method or algorithm described in this disclosure may be directly embodied in hardware, in a software module executed by a processor, or in a combination thereof. The software module may reside in a RAM memory, flash memory, ROM memory, EPROM memory, EEPROM memory, register, hard disk, removable disk, or any other form of storage medium known in the art. An exemplary storage medium is coupled to the processor so that the processor can read and write information from/to the storage medium. In an alternative, the storage medium may be integrated into the processor. The processor and the storage medium may reside in ASIC. The ASIC may reside in the user terminal. In an alternative, the processor and the storage medium may reside a user terminal as discrete components.

In one or more exemplary designs, the functions may be implemented in hardware, software, firmware, or any combination thereof. If implemented in software, each function may be stored on or transmitted by a computer-readable medium as one or more instructions or codes. Computer-readable medium includes both computer storage media and communication media, the latter including any medium that facilitates transfer of a computer program from one place to another. Storage media may be any available media that can be accessed by a general purpose or special purpose computer.

The embodiments of the present disclosure are merely for ease of description and assistance in comprehension of the present disclosure, and are not intended to limit the scope of the present disclosure. Therefore, it should be understood that, except for the embodiments disclosed herein, all modifications and changes or forms of modifications and changes derived from the technical concept of the present disclosure fall within the scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a target base station in a wireless communication system, the method comprising:
   receiving, from a source base station, a first message for requesting conditional handover (CHO);
   transmitting, to the source base station, a second message associated with a handover success;
   receiving, from the source base station, a sequence number (SN) status transfer message including a CHO candidate cell list or at least one CHO execution condition; and
   storing the CHO candidate cell list or the at least one CHO execution condition.

2. The method of claim 1, further comprising:
   transmitting, to the source base station, a handover report message including a type of a handover report and information on a CHO configuration, and
   wherein the type of the handover report indicates one of a too late CHO execution, a too early CHO execution, or a CHO execution to a wrong cell.

3. The method of claim 1, further comprising:
   receiving, from a third base station, a third message associated with a failure indication, the third message including a radio link failure (RLF) report of a user equipment (UE), and
   wherein the RLF report includes at least one of information on whether the CHO is executed, an identifier of a target cell associated with a CHO failure, an identifier of a cell associated with a CHO based recovery, or information on a time between a CHO execution and a reception of a reconfiguration message associated with the CHO.

4. The method of claim 1, wherein the CHO candidate cell list includes a global cell identifier (ID) of each candidate cell associated with the CHO, and
wherein the at least one CHO execution condition includes a condition in a radio resource control (RRC) reconfiguration message.

5. The method of claim 1, further comprising:
transmitting, to the source base station, a handover report message,
wherein the handover report message incudes the CHO candidate cell list, the CHO execution condition and a radio link failure (RLF) report of a user equipment (UE).

6. A method performed by a source base station in a wireless communication system, the method comprising:
transmitting, to a target base station, a first message for requesting conditional handover (CHO);
receiving, from the target base station, a second message associated with a handover success; and
transmitting, to the target base station, a sequence number (SN) status transfer message including a CHO candidate cell list or at least one CHO execution condition,
wherein the CHO candidate cell list or the at least one CHO execution condition is stored in the target base station.

7. The method of claim 6, further comprising:
receiving, from the target base station, a handover report message including a type of a handover report and information on a CHO configuration, and
wherein the type of the handover report indicates one of a too late CHO execution, a too early CHO execution, or a CHO execution to a wrong cell.

8. The method of claim 6,
wherein the CHO candidate cell list includes a global cell identifier (ID) of each candidate cell associated with the CHO.

9. The method of claim 8, wherein the at least one CHO execution condition includes a condition in a radio resource control (RRC) reconfiguration message.

10. The method of claim 6, further comprising:
receiving, from the target base station, a handover report message,
wherein the handover report message incudes the CHO candidate cell list, the CHO execution condition and a radio link failure (RLF) report of a user equipment (UE).

11. A target base station in a wireless communication system, comprising:
a transceiver configured to transmit and receive a signal; and
a controller configured to:
receive, from a source base station via the transceiver, a first message for requesting conditional handover (CHO);
transmit, to the source base station via the transceiver, a second message associated with a handover success;
receive, from the source base station via the transceiver, a sequence number (SN) status transfer message including a CHO candidate cell list or at least one CHO execution condition; and
store the CHO candidate cell list or the at least one CHO execution condition.

12. The target base station of claim 11, wherein the controller is further configured to transmit, to the source base station, a handover report message including a type of a handover report and information on a CHO configuration, and
wherein the type of the handover report indicates one of a too late CHO execution, a too early CHO execution, or a CHO execution to a wrong cell.

13. The target base station of claim 11,
wherein the CHO candidate cell list includes a global cell identifier (ID) of each candidate cell associated with the CHO, and
wherein the at least one CHO execution condition includes a condition in a radio resource control (RRC) reconfiguration message.

14. The target base station of claim 11, wherein the controller is further configured to:
receive, from a third base station, a third message associated with a failure indication, wherein the third message includes a radio link failure (RLF) report of a user equipment (UE),
wherein the RLF report includes at least one of information on whether the CHO is executed, an identifier of a target cell associated with a CHO failure, an identifier of a cell associated with a CHO based recovery, or information on a time between a CHO execution and a reception of a reconfiguration message associated with the CHO.

15. The target base station of claim 11, wherein the controller is further configured to:
transmit, to the source base station, a handover report message,
wherein the handover report message incudes the CHO candidate cell list, the CHO execution condition and a radio link failure (RLF) report of a user equipment (UE).

16. A source base station in a wireless communication system, comprising:
a transceiver configured to transmit and receive a signal; and
a controller configured to:
transmit, to a target base station via the transceiver, a first message for requesting conditional handover (CHO),
receive, from the target base station via the transceiver, a second message associated with a handover success, and
transmit, to the target base station via the transceiver, a sequence number (SN) status transfer message including a CHO candidate cell list or at least one CHO execution condition,
wherein the CHO candidate cell list or the at least one CHO execution condition is stored in the target base station.

17. The source base station of claim 16, wherein the controller is further configured to receive, from the target base station, a handover report message including a type of a handover report and information on a CHO configuration, and
wherein the type of the handover report indicates one of a too late CHO execution, a too early CHO execution, or a CHO execution to a wrong cell.

18. The source base station of claim 16, wherein the CHO candidate cell list includes a global cell identifier (ID) of each candidate cell associated with the CHO, and wherein the at least one CHO execution condition includes a condition in a radio resource control (RRC) reconfiguration message.

19. The source base station of claim 16, wherein the controller is further configured to:
receive, from the target base station, a handover report message,
wherein the handover report message incudes the CHO candidate cell list, the CHO execution condition and a radio link failure (RLF) report of a user equipment (UE).

* * * * *